(12) United States Patent
Sreekumari et al.

(10) Patent No.: US 12,475,568 B2
(45) Date of Patent: Nov. 18, 2025

(54) ANATOMY-DRIVEN AUGMENTATION OF MEDICAL IMAGES

(71) Applicant: GE Precision Healthcare LLC, Wauwatosa, WI (US)

(72) Inventors: Arathi Sreekumari, Bangalore (IN); Krishna Seetharam Shriram, Bengaluru (IN); Deepa Anand, Bangalore (IN); Pavan Annangi, Bangalore (IN); Bhushan Patil, Pune (IN); Stephan W. Anzengruber, Ried im Innkreis (AT)

(73) Assignee: GE Precision Healthcare LLC, Waukesha, WI (US)

( * ) Notice: Subject to any disclaimer, the term of this patent is extended or adjusted under 35 U.S.C. 154(b) by 373 days.

(21) Appl. No.: 18/166,907

(22) Filed: Feb. 9, 2023

(65) Prior Publication Data

US 2024/0273731 A1  Aug. 15, 2024

(51) Int. Cl.
G06T 7/136 (2017.01)
G06T 7/00 (2017.01)

(52) U.S. Cl.
CPC ............ *G06T 7/136* (2017.01); *G06T 7/0012* (2013.01); *G06T 2207/10132* (2013.01);
(Continued)

(58) Field of Classification Search
None
See application file for complete search history.

(56) References Cited

U.S. PATENT DOCUMENTS 6,185,320 B1 *  2/2001  Bick ................. G06T 7/187
                                                  382/209
8,163,896 B1 *  4/2012  Bentwich ........... C07K 14/4702
                                                  536/23.1

(Continued)

OTHER PUBLICATIONS

Trimech, I. et al. | "Data Augmentation using non-rigid CPD Registration for 3D Facial Expression Recognition," 2019 16th International Multi-Conference on Systems, Signals & Devices (SSD), Istanbul, Turkey, 2019, pp. 164-169, doi: 10.1109/SSD.2019.8893278.

(Continued)

*Primary Examiner* — Tsung Yin Tsai
(74) *Attorney, Agent, or Firm* — Amin, Turocy & Watson, LLP

(57) ABSTRACT

Systems/techniques that facilitate anatomy-driven augmentation of medical images are provided. In various embodiments, a system can access a medical image and a ground-truth segmentation mask corresponding to the medical image, wherein the ground-truth segmentation mask can indicate a location of a first anatomical structure depicted in the medical image. In various aspects, the system can create an augmented version of the medical image and an augmented version of the ground-truth segmentation mask, by applying a continuous deformation field to fewer than all pixels or voxels in the medical image and in the ground-truth segmentation mask. In various instances, the continuous deformation field can encompass: pixels or voxels that correspond to the first anatomical structure; and pixels or voxels that correspond to a surrounding periphery of the first anatomical structure.

20 Claims, 15 Drawing Sheets

(52) U.S. Cl.
CPC .............. *G06T 2207/20081* (2013.01); *G06T 2207/20084* (2013.01); *G06T 2207/30016* (2013.01); *G06T 2207/30096* (2013.01)

(56) References Cited

U.S. PATENT DOCUMENTS

| | | | | |
|---|---|---|---|---|
| 9,311,670 | B2* | 4/2016 | Hoffberg | H04W 4/029 |
| 10,140,544 | B1* | 11/2018 | Zhao | G06N 20/00 |
| 12,106,478 | B2* | 10/2024 | C | G06T 7/0014 |
| 2002/0042386 | A1* | 4/2002 | Rosen | A61K 48/00 |
| | | | | 435/325 |
| 2009/0228299 | A1* | 9/2009 | Kangarloo | G16H 30/40 |
| | | | | 707/999.005 |
| 2017/0337682 | A1* | 11/2017 | Liao | G06T 7/30 |
| 2018/0344397 | A1* | 12/2018 | Chu | A61B 18/18 |
| 2020/0364864 | A1* | 11/2020 | Shanbhag | G06T 11/008 |
| 2022/0301163 | A1* | 9/2022 | C | G06T 7/187 |
| 2023/0169659 | A1* | 6/2023 | Chen | G06T 7/11 |
| | | | | 382/131 |
| 2024/0029415 | A1* | 1/2024 | Shanbhag | G06V 10/82 |
| 2024/0273731 | A1* | 8/2024 | Sreekumari | G06T 7/136 |

OTHER PUBLICATIONS

Olut, S. et al. | "Adversarial Data Augmentation via Deformation Statistics." ECCV 2020: 16th European Conference, Glasgow, UK, Aug. 23-28, 2020, Proceedings, Part XXIX Aug. 2020, https://doi.org/10.1007/978-3-030-58526-6_38, 17 pages.

* cited by examiner

ANATOMY-DRIVEN AUGMENTATION OF MEDICAL IMAGES

TECHNICAL FIELD

The subject disclosure relates generally to image augmentation, and more specifically to anatomy-driven augmentation of medical images.

BACKGROUND

A deep learning neural network can be trained to perform image segmentation on inputted medical images. During deployment, the deep learning neural network can be expected to reliably perform image segmentation only on medical images whose visual characteristics are sufficiently similar to those of the medical images on which the deep learning neural network was trained. Accordingly, to help the deep learning neural network encounter a wide, varied range of visual characteristics during training, a training dataset comprising medical images and corresponding ground-truth segmentation masks can be curated, and such training dataset can be enriched or enlarged via image augmentation. Various existing techniques for facilitating image augmentation involve adjusting non-substantive visual characteristics of the training dataset, such as brightness/contrast or image orientation. Unfortunately, such existing techniques do not produce biologically-substantive diversity in the training dataset. Various other existing techniques for facilitating image augmentation involve deforming entire medical images in the training dataset to match pre-made templates or reference images. Unfortunately, such other existing techniques are not generalizable since such pre-made templates or reference images are often unavailable.

Accordingly, systems or techniques that can facilitate image augmentation in a biologically-substantive fashion and without relying upon pre-made templates or reference images can be considered as desirable.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus or computer program products that facilitate anatomy-driven augmentation of medical images are described.

According to one or more embodiments, a system is provided. The system can comprise a non-transitory computer-readable memory that can store computer-executable components. The system can further comprise a processor that can be operably coupled to the non-transitory computer-readable memory and that can execute the computer-executable components stored in the non-transitory computer-readable memory. In various embodiments, the computer-executable components can comprise an access component that can access a medical image and a ground-truth segmentation mask corresponding to the medical image, wherein the ground-truth segmentation mask can indicate a location of a first anatomical structure depicted in the medical image. In various aspects, the computer-executable components can comprise a deformation component that can create an augmented version of the medical image and an augmented version of the ground-truth segmentation mask, by applying a continuous deformation field to fewer than all pixels or voxels in the medical image and in the ground-truth segmentation mask. In various instances, the continuous deformation field can encompass: pixels or voxels that correspond to the first anatomical structure; and pixels or voxels that correspond to a surrounding periphery of the first anatomical structure.

According to one or more embodiments described herein, a computer-implemented method is provided. In various embodiments, the computer-implemented method can comprise accessing, by a device operatively coupled to a processor, a medical image and a ground-truth segmentation mask corresponding to the medical image, wherein the ground-truth segmentation mask can indicate a location of a first anatomical structure depicted in the medical image. In various aspects, the computer-implemented method can comprise creating, by the device, an augmented version of the medical image and an augmented version of the ground-truth segmentation mask, by applying a continuous deformation field to fewer than all pixels or voxels in the medical image and in the ground-truth segmentation mask. In various instances, the continuous deformation field can encompass: pixels or voxels that correspond to the first anatomical structure; and pixels or voxels that correspond to a surrounding periphery of the first anatomical structure.

According to one or more embodiments, a computer program product for facilitating anatomy-driven augmentation of medical images is provided. In various embodiments, the computer program product can comprise a non-transitory computer-readable memory having program instructions embodied therewith. In various aspects, the program instructions can be executable by a processor to cause the processor to access an image. In various instances, the program instructions can be further executable to cause the processor to access a segmentation mask indicating where in the image a first structure is located. In various cases, the program instructions can be further executable to cause the processor to apply a continuous deformation field to the segmentation mask, thereby yielding an augmented version of the segmentation mask, wherein the continuous deformation field can deform only: pixels or voxels of the segmentation mask that make up the first structure; and pixels or voxels of the segmentation mask that are within a threshold proximity of the first structure. In various aspects, the program instructions can be further executable to cause the processor to apply the continuous deformation field to the image, thereby yielding an augmented version of the image, wherein the continuous deformation field can deform only: pixels or voxels of the image that make up the first structure; and pixels or voxels of the image that are within the threshold proximity of the first structure.

DETAILED DESCRIPTION

Figure 1:
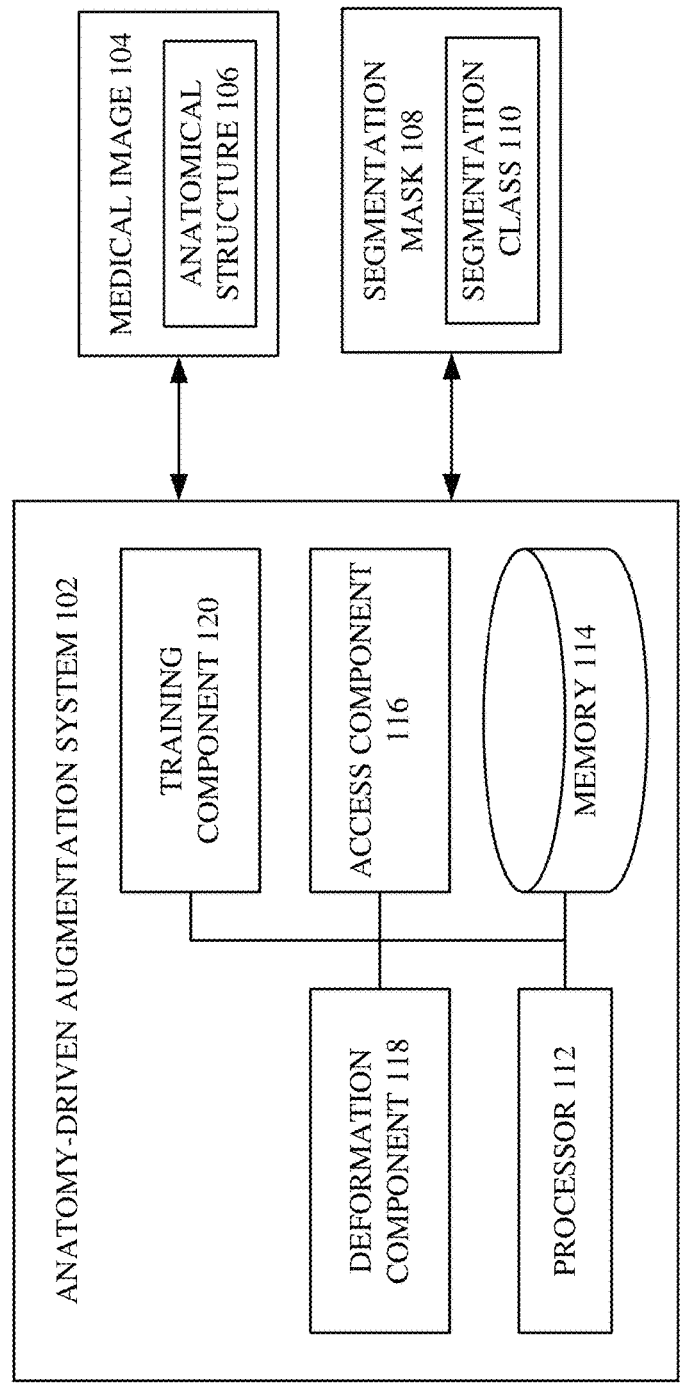
FIG. 1 illustrates a block diagram of an example, non-limiting system that facilitates anatomy-driven augmentation of medical images in accordance with one or more embodiments described herein.

The following detailed description is merely illustrative and is not intended to limit embodiments or application/uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

A deep learning neural network can be trained to perform image segmentation on inputted medical images (e.g., on computed tomography (CT) scanned images, on magnetic resonance imaging (MRI) scanned images, on positron emission tomography (PET) scanned images, on X-ray scanned images, on ultrasound scanned images).

During deployment (e.g., during inferencing, post-training), the deep learning neural network can be expected to reliably or otherwise accurately perform image segmentation only on medical images whose visual characteristics (e.g., whose color maps, whose brightness/contrast levels, whose orientations, whose depicted anatomical structures) are sufficiently similar to those of the medical images on which the deep learning neural network was trained. In other words, the deep learning neural network cannot be expected to properly segment a medical image that looks too dissimilar from those medical images that were encountered during training.

Thus, to promote reliable or accurate performance of the deep learning neural network during deployment, it can be beneficial for the deep learning neural network to encounter a wide, varied range of visual characteristics during training. To help the deep learning neural network encounter such a wide, varied range of visual characteristics during training, a training dataset comprising medical images and corresponding ground-truth segmentation masks can be curated, and such training dataset can be enriched or enlarged via image augmentation.

Various existing techniques for facilitating image augmentation involve adjusting non-substantive visual characteristics of the training dataset. For example, some of such existing techniques involve adjusting brightness/contrast levels of medical images in the training dataset, so that the deep learning neural network can become agnostic to (e.g., can learn how to not be impeded by) brightness/contrast differences in inputted medical images. As another example, some of such existing techniques involve adjusting orientations of medical images (and of their corresponding ground-truth segmentation masks) in the training dataset (e.g., by rigidly rotating various medical images about various axes by various angular displacements), so that the deep learning neural network can become agnostic to orientation differences in inputted medical images. Unfortunately, such existing techniques do not produce biologically-substantive diversity in the training dataset. In other words, altering the brightness/contrast or orientation of a medical image does not correspondingly alter the types or shapes of anatomical structures that are depicted in that medical image.

Various other existing techniques for facilitating image augmentation involve deforming entire medical images (and their corresponding ground-truth segmentation masks) in the training dataset to match pre-made templates or reference images. For example, some of such other existing techniques involve applying deformation fields to entireties of facial images (e.g., such that those deformation fields affect or otherwise cover all pixels or voxels in those facial images), so as to non-rigidly register those facial images with pre-made facial expression templates (e.g., with a smiling template, with a frowning template, with a surprised template, with a scared template, with an angry template, with a disgusted template). The ground-truth segmentation masks of those facial images can be similarly deformed to match corresponding templates. Unfortunately, such other existing techniques are not generalizable since such pre-made templates or reference images are often unavailable. That is, in the absence of such pre-made templates or reference images, such other existing techniques cannot be implemented.

Accordingly, systems or techniques that can facilitate image augmentation in a biologically-substantive fashion and without relying upon pre-made templates or reference images can be considered as desirable.

Various embodiments described herein can address one or more of these technical problems. One or more embodiments described herein can include systems, computer-implemented methods, apparatus, or computer program products that can facilitate anatomy-driven augmentation of medical images. More specifically, the inventors of various embodiments described herein recognized that biologically-substantive diversity of a training dataset can be increased in the absence of pre-made templates or reference images, by applying anatomically-targeted deformation fields to the training dataset.

More specifically still, for any given medical image in the training dataset, there can be a given segmentation mask in the training dataset that corresponds to the given medical image. In various aspects, that given segmentation mask can be considered as indicating which pixels or voxels of the given medical image make up or otherwise belong to an anatomical structure of interest. In various instances, any suitable deformation field that is continuous and zero at its boundaries can be applied to both the given segmentation mask and to the given medical image. In various cases, the deformation field can cover less than an entirety of the given segmentation mask and less than an entirety of the given medical image. Indeed, the deformation field can cover only: whatever pixels or voxels of the given segmentation mask and of the given medical image that belong to the anatomical structure of interest; and whatever pixels or voxels of the given segmentation mask and of the given medical image that belong to a surrounding periphery of the anatomical structure of interest (e.g., that are within any suitable threshold distances of a boundary of the anatomical structure of interest). Accordingly, application of the deformation field to the given segmentation mask and to the given medical image can smoothly distort or otherwise warp not just the anatomical structure of interest, but also its surrounding periphery, without distorting or warping the rest of the given medical image and the rest of the given segmentation mask. Because the deformation field can smoothly distort or warp both the anatomical structure of interest and its surrounding periphery, a sense of biological realism exhibited by the anatomical structure of interest can be preserved. In other words, the deformed versions of the given medical image and of the given segmentation mask can be considered as illustrating a differently-shaped version of the anatomical structure of interest that is nevertheless biologically plausible (e.g., such biological plausibility or realism can be considered as being caused by the fact that the surrounding periphery is deformed smoothly or commensurately with the anatomical structure of interest). In any case, the deformed versions of the given medical image and of the given segmentation mask can be implemented to train a deep learning neural network to perform image segmentation.

Various embodiments described herein can be considered as a computerized tool (e.g., any suitable combination of computer-executable hardware or computer-executable software) that can facilitate anatomy-driven augmentation of medical images. In various aspects, such computerized tool can comprise an access component, a deformation component, or a training component.

In various embodiments, there can be a medical image. In various aspects, the medical image can visually depict or illustrate any suitable anatomical structure (e.g., a fibroid, a tumor) of a medical patient (e.g., human, animal, or otherwise). In various instances, the medical image can exhibit any suitable size, format, or dimensionality. For example, the medical image can be a two-dimensional array of pixels. As another example, the medical image can be a three-dimensional array of voxels. In various cases, the medical image can have been generated or otherwise captured via any suitable medical imaging modality (e.g., CT scanner, MRI scanner, PET scanner, X-ray scanner, ultrasound scanner). In various aspects, the medical image can have undergone any suitable type of image reconstruction techniques (e.g., filtered back projection).

In various embodiments, there can be a segmentation mask that can correspond to the medical image. In various aspects, the segmentation mask can exhibit the same size, format, or dimensionality as the medical image. For example, suppose that the medical image is a two-dimensional pixel array. In such case, the segmentation mask can likewise be a two-dimensional pixel array having the same number of pixel rows and pixel columns as the medical image. As another example, suppose that the medical image is instead a three-dimensional voxel array. In such case, the segmentation mask can likewise be a three-dimensional voxel array having the same number of voxel rows, voxel columns, and voxel layers as the medical image.

In any case, the segmentation mask can be considered as a ground-truth annotation that indicates or otherwise represents which pixels or voxels of the medical image belong to or otherwise make up the anatomical structure. For instance, the segmentation mask can be a binary mask that can illustrate a first segmentation class and a second segmentation class, where the first segmentation class can denote the pixels or voxels that make up the anatomical structure as depicted in the medical image, and where the second segmentation class can denote the pixels or voxels that instead make up a background of the medical image. As an example, pixels or voxels of the segmentation mask that have a first value (e.g., 1) can be considered as belonging to the first segmentation class. Accordingly, whatever pixels or voxels of the medical image that have the same location indices as those pixels or voxels that belong to the first segmentation class can be considered as making up the anatomical structure. In contrast, pixels or voxels of the segmentation mask that have a second value (e.g., 0) can be considered as belonging to the second segmentation class. Thus, whatever pixels or voxels of the medical image that have the same location indices as the pixels or voxels that belong to the second segmentation class can be considered as making up the background of the medical image.

In various aspects, it can be desired to augment the medical image and the segmentation mask in a biologically-substantive fashion, without utilizing pre-made templates or reference images. The computerized tool described herein can facilitate such augmentation.

In various embodiments, the access component of the computerized tool can electronically receive or otherwise electronically access the medical image and the segmentation mask. In some aspects, the access component can electronically retrieve the medical image and the segmentation mask from any suitable centralized or decentralized data structures (e.g., graph data structures, relational data structures, hybrid data structures), whether remote from or local to the access component. In any case, the access component can electronically obtain or access the medical image and the segmentation mask, such that other components of the computerized tool can electronically interact with (e.g., read, write, edit, copy, manipulate) the medical image and the segmentation mask.

In various embodiments, the deformation component of the computerized tool can electronically apply a non-rigid deformation field to the segmentation mask, thereby yielding an augmented segmentation mask.

In various aspects, the non-rigid deformation field can be any suitable vector field that indicates how respective pixels or voxels of the segmentation mask should be spatially moved so as to generate the augmented segmentation mask. For example, suppose that the segmentation mask is a two-dimensional pixel array. In such case, the non-rigid deformation field can be a two-dimensional array of elements, where each element of the non-rigid deformation field can be a two-dimensional displacement vector indicating a direction in which and a distance by which a respective pixel of the segmentation mask is to be moved or shifted. As another example, suppose that the segmentation mask is instead a three-dimensional voxel array. In such case, the non-rigid deformation field can be a three-dimensional array of elements, where each element of the non-rigid deformation field can be a three-dimensional displacement vector indicating a direction in which and a distance by which a respective voxel of the segmentation mask is to be moved or shifted.

In various aspects, the non-rigid deformation field can be continuous, as opposed to discontinuous. Further still, the non-rigid deformation field can, in various instances, be zero at its boundaries (e.g., at its outer edges or outer surfaces). Accordingly, due to such continuity and such boundary condition, the displacement vectors of the non-rigid deformation field can smoothly vary in magnitude and direction throughout the non-rigid deformation field, and such displacement vectors can taper to zero (e.g., to zero deformation or zero displacement) at the extremities or edges of the non-rigid deformation field.

In any case, the non-rigid deformation field can apply to less than an entirety of the segmentation mask. In particular, the non-rigid deformation field can be targeted about the first segmentation class. In other words, the non-rigid deformation field can refrain from covering, encompassing, deforming, or otherwise affecting every pixel or voxel of the segmentation mask. Instead, the non-rigid deformation field can cover, encompass, deform, or otherwise affect only: whatever pixels or voxels of the segmentation mask that belong to the first segmentation class; and whatever pixels or voxels of the segmentation mask that make up a surrounding periphery of the first segmentation class. In various cases, the surrounding periphery can be considered as a set of pixels or voxels that do not belong to the first segmentation class, but that are nevertheless adjacent to or otherwise spatially near (e.g., within any suitable proximity) of the first segmentation class.

Because the non-rigid deformation field can cover only the first segmentation class and its surrounding periphery, the non-rigid deformation field can distort, warp, deform or otherwise re-shape the first segmentation class and the surrounding periphery, while leaving the remainder of the segmentation mask unchanged. Because the non-rigid deformation field can be continuous and can be zero at its boundaries, the non-rigid deformation field can refrain from altering a structural topology of the first segmentation class and of the surrounding periphery. In other words, although the first segmentation class and the surrounding periphery as depicted in the augmented segmentation mask can be differently shaped than as originally depicted in the segmentation mask, they can nevertheless be topologically equivalent to how they are originally depicted in the segmentation mask.

Now, in various aspects, the deformation component of the computerized tool can identically apply the non-rigid deformation field to the medical image, thereby yielding an augmented medical image. As mentioned above, the non-rigid deformation field as applied to the segmentation mask can be targeted about the first segmentation class. Because the first segmentation class can represent the anatomical structure, the non-rigid deformation field as applied to the medical image can be targeted about the anatomical structure. That is, the non-rigid deformation field can refrain from covering, encompassing, deforming, or otherwise affecting every pixel or voxel of the medical image. Instead, the non-rigid deformation field can cover, encompass, deform, or otherwise affect only: whatever pixels or voxels of the medical image that belong to the anatomical structure; and whatever pixels or voxels of the medical image that make up the surrounding periphery.

Because the non-rigid deformation field can cover only the anatomical structure and the surrounding periphery, the non-rigid deformation field can distort, warp, deform or otherwise re-shape the anatomical structure and the surrounding periphery, while leaving the remainder of the medical image unchanged. Just as above, because the non-rigid deformation field can be continuous and can be zero at its boundaries, the non-rigid deformation field can refrain from altering a structural topology of the anatomical structure and of the surrounding periphery. That is, although the anatomical structure and the surrounding periphery as depicted in the augmented medical image can be differently shaped than as originally depicted in the medical image, they can nevertheless be topologically equivalent to how they are originally depicted in the medical image. In other words, the non-rigid deformation field can distort, warp, deform, or otherwise re-shape any other objects or portions of objects that might be depicted within the surrounding periphery commensurately with the anatomical structure. In still other words, it can appear that such other objects or portions of objects can have been pulled, pushed, or otherwise moved by the deformed version of the anatomical structure. This commensurate deformation of the other objects or portions of objects can cause the augmented medical image to retain biological plausibility (e.g., to nevertheless look realistic).

In any case, because the segmentation mask can already have been considered as a ground-truth annotation for the medical image, and because both the augmented segmentation mask and the augmented medical image can have been generated via the non-rigid deformation field, the augmented segmentation mask can be considered as a ground-truth annotation that corresponds to the augmented medical image. That is, the deformed version of the first segmentation class can be considered as correctly or accurately indicating which pixels or voxels belong to or otherwise make up the deformed version of the anatomical structure.

In various embodiments, the training component of the computerized tool can electronically store, maintain, control, or otherwise access a deep learning neural network, and the training component can electronically train the deep learning neural network using the augmented medical image and the augmented segmentation mask, as described herein.

In various aspects, the deep learning neural network can exhibit any suitable internal architecture. For example, the deep learning neural network can include any suitable numbers of any suitable types of layers (e.g., input layer, one or more hidden layers, output layer, any of which can be convolutional layers, dense layers, non-linearity layers, pooling layers, batch normalization layers, or padding layers). As another example, the deep learning neural network can include any suitable numbers of neurons in various layers (e.g., different layers can have the same or different numbers of neurons as each other). As yet another example, the deep learning neural network can include any suitable activation functions (e.g., softmax, sigmoid, hyperbolic tangent, rectified linear unit) in various neurons (e.g., different neurons can have the same or different activation functions as each other). As still another example, the deep learning neural network can include any suitable interneuron connections or interlayer connections (e.g., forward connections, skip connections, recurrent connections).

Regardless of the internal architecture of the deep learning neural network, the training component can randomly initialize trainable internal parameters (e.g., weights, biases, convolutional kernels) of the deep learning neural network, prior to training.

In various instances, the training component can execute the deep learning neural network on the augmented medical image, thereby causing the deep learning neural network to produce some output. For example, the training component can feed the augmented medical image to an input layer of the deep learning neural network, the augmented medical image can complete a forward pass through one or more hidden layers of the deep learning neural network, and an output layer of the deep learning neural network can compute the output based on activations generated by the one or more hidden layers. Note that, in various cases, the size, format, or dimensionality of the output can be controlled or otherwise determined by the number of neurons in the output layer (e.g., an output of a desired size, format, or dimensionality can be achieved by adding neurons to or removing neurons from the output layer). In any case, the output can be considered as the predicted or inferred segmentation mask that the deep learning neural network identifies as corresponding to the augmented medical image. In contrast, the augmented segmentation mask can be considered as the correct or accurate ground-truth that is known or deemed to correspond to the augmented medical image. Note that, if the deep learning neural network has so far undergone no or little training, then the output can be highly inaccurate (e.g., can be highly different from the augmented segmentation mask). In various aspects, the training component can compute one or more errors or losses (e.g., mean absolute error (MAE), mean squared error (MSE), cross-entropy) between the output and the augmented segmentation mask. In various instances, the training component can update the internal parameters of the deep learning neural network by performing backpropagation (e.g., stochastic gradient descent) driven by the one or more errors or losses.

In various instances, the computerized tool can perform anatomy-driven augmentation on any suitable number of medical images and corresponding segmentation masks. Accordingly, the computerized tool can, in various aspects, generate, expand, or otherwise enrich an entire training dataset via anatomy-driven augmentation as described herein, and the training component can train the deep learning neural network using such training dataset. In such case, the training component can implement any suitable training batch sizes, any suitable training termination criteria, or any suitable error, loss, or objective functions.

Various embodiments described herein can be employed to use hardware or software to solve problems that are highly technical in nature (e.g., to facilitate anatomy-driven augmentation of medical images), that are not abstract and that cannot be performed as a set of mental acts by a human. Further, some of the processes performed can be performed by a specialized computer for carrying out defined acts related to anatomy-driven augmentation of medical images. For example, such defined acts can include: accessing, by a device operatively coupled to a processor, a medical image and a ground-truth segmentation mask corresponding to the medical image, wherein the ground-truth segmentation mask can indicate a location of a first anatomical structure depicted in the medical image; and creating, by the device, an augmented version of the medical image and an augmented version of the ground-truth segmentation mask, by applying a continuous deformation field to fewer than all pixels or voxels in the medical image and in the ground-truth segmentation mask, wherein the continuous deformation field can encompass: pixels or voxels that correspond to the first anatomical structure; and pixels or voxels that correspond to a surrounding periphery of the first anatomical structure. In various cases, at least a portion of a second anatomical structure can be depicted within the surrounding periphery of the first anatomical structure, such that the continuous deformation field can deform the portion of the second anatomical structure commensurately with the first anatomical structure. In some instances, such defined acts can further include: training, by the device, a deep learning neural network on the augmented version of the medical image and the augmented version of the ground-truth segmentation mask.

Such defined acts are not performed manually by humans. Indeed, neither the human mind nor a human with pen and paper can: electronically access a medical image (e.g., a CT scanned image, an MRI scanned image, an X-ray scanned image) and a corresponding pixel-wise or voxel-wise segmentation mask that indicates where an anatomical structure is located within the medical image; electronically distort both the medical image and the segmentation mask by applying a continuous deformation field only to the pixels or voxels making up the anatomical structure and a surrounding periphery of the anatomical structure; and electronically train a deep learning neural network using such deformed versions of the medical image and of the segmentation mask. Indeed, medical images are inherently computerized constructs that are generated or captured by electronic medical hardware (e.g., CT scanners, MRI scanners, X-ray scanners, PET scanners, ultrasound scanners) and not in any way by the human mind without computers. Likewise, image deformation is an inherently computerized process of rearranging or reorganizing the pixels or voxels of a medical image (e.g., the human mind, even with the assistance of pen and paper, cannot rearrange or reorganize pixels or voxels in any reasonable or meaningful sense). Similarly, deep learning neural networks are inherently computerized constructs that cannot be executed or trained by the human mind, even with the assistance of pen and paper. Accordingly, a computerized tool that can augment medical images and corresponding segmentation masks via deformation fields and that can subsequently train a deep learning neural network using such augmented medical images and segmentation masks is inherently-computerized and cannot be implemented in any sensible, practical, or reasonable way without computers.

Moreover, various embodiments described herein can integrate into a practical application various teachings relating to anatomy-driven augmentation of medical images. As explained above, image augmentation can be utilized to enrich a training dataset on which to train a deep learning neural network. Some existing techniques for performing image augmentation make non-biologically-substantive modifications to medical images in the training dataset (e.g., changes to brightness/contrast, changes to image orientation). Other existing techniques for performing image augmentation warp medical images and their segmentation masks in the training dataset so to match pre-made reference templates, which are often unavailable.

Various embodiments described herein can address these technical problems, by facilitating image augmentation in a biologically-substantive fashion without relying upon pre-made reference templates. In particular, various embodiments described herein can involve applying a continuous, zero-boundary, non-rigid deformation field only to those pixels of voxels that make up an anatomical structure of interest and to those pixels of voxels that make up a surrounding periphery of the anatomical structure of interest. Because the deformation field can be continuous and can have a zero boundary condition, and because the deformation field can apply only to the anatomical structure and its surrounding periphery, the deformation field can smoothly deform the anatomical structure and whatever other objects are located in its surrounding periphery without altering a topology of the anatomical structure and of such other objects. In other words, the deformation field can perform a biologically-substantive alteration on both the medical image and its segmentation mask (e.g., can change the shapes of the anatomical structure and its surrounding periphery) in a biologically plausible or realistic way. Contrast this with existing techniques that perform only non-biologically-substantive alterations (e.g., brightness/contrast alterations, orientation alterations). Moreover, note that this can be accomplished without any pre-made reference templates. In other words, the deformation field can have any suitable displacement vectors, as long as the deformation field is continuous and has a zero boundary condition. That is, the deformation field need not be constructed according to a pre-made reference template. Accordingly, various embodiments described herein certainly constitute concrete and tangible technical improvements in the field of image augmentation, and thus such embodiments clearly qualify as useful and practical applications of computers.

Furthermore, various embodiments described herein can control real-world tangible devices based on the disclosed teachings. For example, various embodiments described herein can electronically augment real-world medical images (e.g., CT images, MRI images, X-ray images, PET images, ultrasound images) and can electronically train real-world neural networks on such augmented real-world medical images.

It should be appreciated that the herein figures and description provide non-limiting examples of various embodiments and are not necessarily drawn to scale.

FIG. 1 illustrates a block diagram of an example, non-limiting system 100 that can facilitate anatomy-driven augmentation of medical images in accordance with one or more embodiments described herein. As shown, an anatomy-driven augmentation system 102 can be electronically integrated, via any suitable wired or wireless electronic connections, with a medical image 104 and with a segmentation mask 108.

In various aspects, the medical image 104 can exhibit any suitable size, format, or dimensionality. As a non-limiting example, the medical image 104 can be an x-by-y array of pixels, for any suitable positive integers x and y, where each pixel can exhibit a respective Hounsfield unit value. As another non-limiting example, the medical image 104 can be an x-by-y-by-z array of voxels, for any suitable positive integers x, y, and z, where each voxel can exhibit a respective Hounsfield unit value.

In various instances, the medical image 104 can be generated or otherwise captured by any suitable medical imaging device, medical imaging equipment, or medical imaging modality (not shown). As a non-limiting example, the medical image 104 can be generated or otherwise captured by a CT scanner, in which case the medical image 104 can be considered as a CT scanned image. As another non-limiting example, the medical image 104 can be generated or otherwise captured by an MRI scanner, in which case the medical image 104 can be considered as an MRI scanned image. As yet another non-limiting example, the medical image 104 can be generated or otherwise captured by a PET scanner, in which case the medical image 104 can be considered as a PET scanned image. As still another non-limiting example, the medical image 104 can be generated or otherwise captured by an X-ray scanner, in which case the medical image 104 can be considered as an X-ray scanned image. As even another non-limiting example, the medical image 104 can be generated or otherwise captured by an ultrasound scanner, in which case the medical image 104 can be considered as an ultrasound scanned image. Moreover, the medical image 104 can have undergone any suitable image reconstruction techniques, such as filtered back projection.

In any case, the medical image 104 can visually depict or otherwise illustrate an anatomical structure 106. In various aspects, the anatomical structure 106 can be any suitable organ, tissue, body part, body cavity, bodily fluid, or portion thereof of any suitable medical patient. As a non-limiting example, the medical image 104 can be an MRI scanned image of a brain of the medical patient, and the anatomical structure 106 can be a tumor of the brain. As another non-limiting example, the medical image 104 can be a trans-vaginal ultrasound scanned image of a uterus of the medical patient, and the anatomical structure 106 can be a fibroid of the uterus. In various instances, the medical image 104 can visually depict or otherwise illustrate any other suitable anatomical structures of the medical patient, where such other anatomical structures can be adjacent to, coupled to, or otherwise related to the anatomical structure 106.

In various aspects, the segmentation mask 108 can be any suitable pixel-wise or voxel-wise segmentation mask that can correspond to the medical image 104. Accordingly, the segmentation mask 108 can exhibit the same size, format, or dimensionality as the medical image 104.

As a non-limiting example, suppose that the medical image 104 is an x-by-y pixel array. In such case, the segmentation mask 108 can likewise be an x-by-y pixel array, where each pixel of the segmentation mask 108 indicates a segmentation class to which a respective (e.g., an identically-positioned) pixel of the medical image 104 belongs. For instance, a pixel (i,j) (e.g., the pixel that is in the i-th row and the j-th column) of the segmentation mask 108 can exhibit a discrete integer value that indicates to which one of two or more segmentation classes a pixel (i,j) of the medical image 104 belongs, for any suitable positive integers $1 \leq i \leq x$ and $1 \leq j \leq y$.

As another non-limiting example, suppose that the medical image 104 is instead an x-by-y-by-z voxel array. In such case, the segmentation mask 108 can likewise be an x-by-y-by-z voxel array, where each voxel of the segmentation mask 108 indicates a segmentation class to which a respective (e.g., an identically-positioned) voxel of the medical image 104 belongs. For instance, a voxel (i,j,k) (e.g., the voxel that is in the i-th row, the j-th column, and the k-th layer) of the segmentation mask 108 can exhibit a discrete integer value that indicates to which one of two or more segmentation classes a voxel (i,j,k) of the medical image 104 belongs, for any suitable positive integers $1 \leq i \leq x$, $1 \leq y \leq y$, and $1 \leq k \leq z$.

In various aspects, the segmentation mask 108 can, in various aspects, be considered as visually depicting or otherwise illustrating a segmentation class 110, where the segmentation class 110 can correspond to the anatomical structure 106. In other words, the segmentation class 110 can be considered as indicating which pixels or voxels of the medical image 104 belong to or otherwise make up the anatomical structure 106. For instance, suppose that a pixel (i,j) (or a voxel (i,j,k), as the case may be) of the segmentation mask 108 belongs to the segmentation class 110. In such case, this can mean that the corresponding pixel (i,j) (or the corresponding voxel (i,j,k), as the case may be) of the medical image 104 belongs to or is otherwise part of the anatomical structure 106. In contrast, suppose that the pixel (i,j) (or the voxel (i,j,k), as the case may be) of the segmentation mask 108 does not belong to the segmentation class 110. In such case, this can mean that the corresponding pixel (i,j) (or the corresponding voxel (i,j,k), as the case may be) of the medical image 104 does not belong to or is otherwise not part of the anatomical structure 106.

Figure 2:
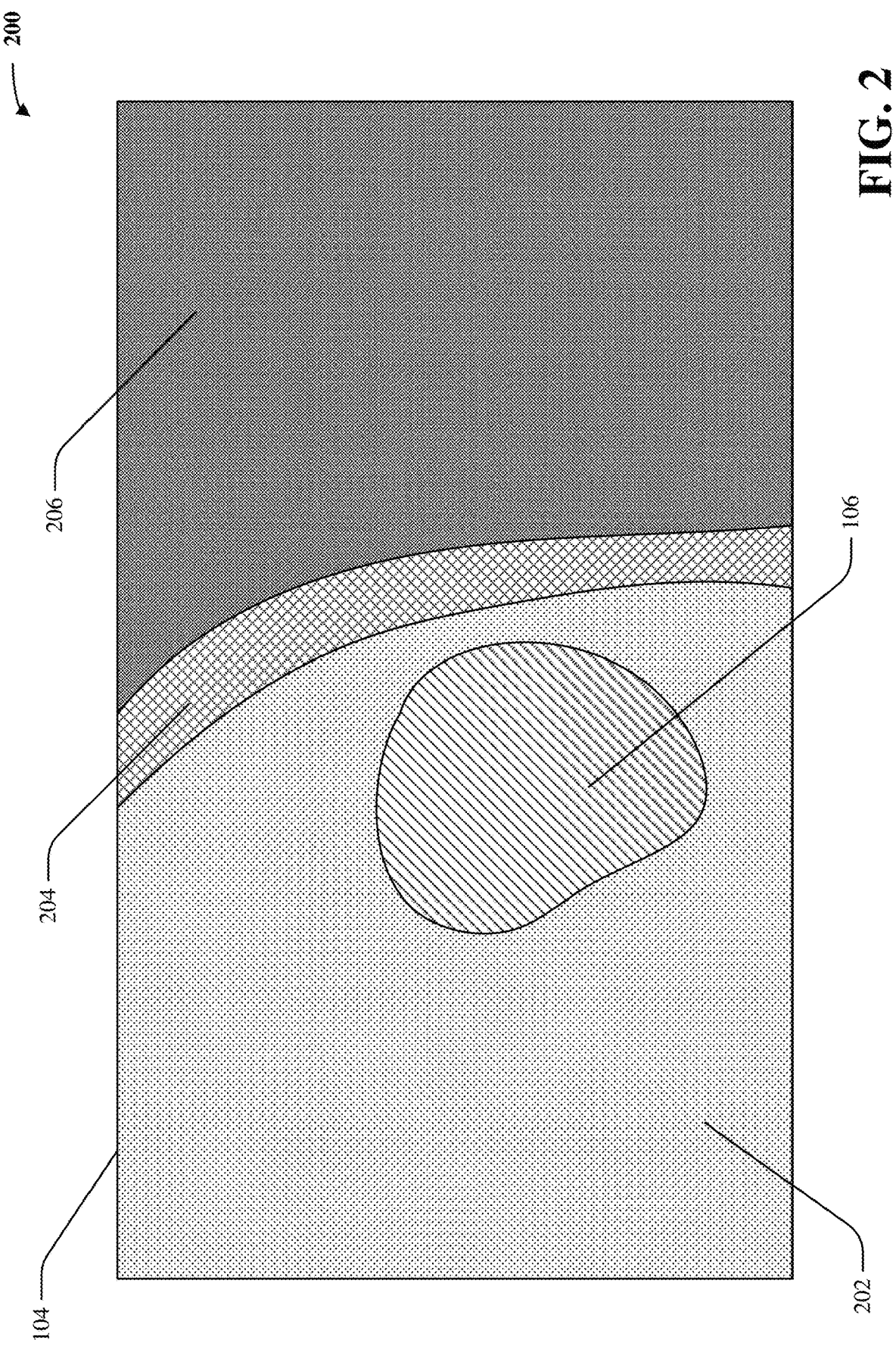
FIG. 2 illustrates an example, non-limiting block diagram of a medical image in accordance with one or more embodiments described herein.
Figure 3:
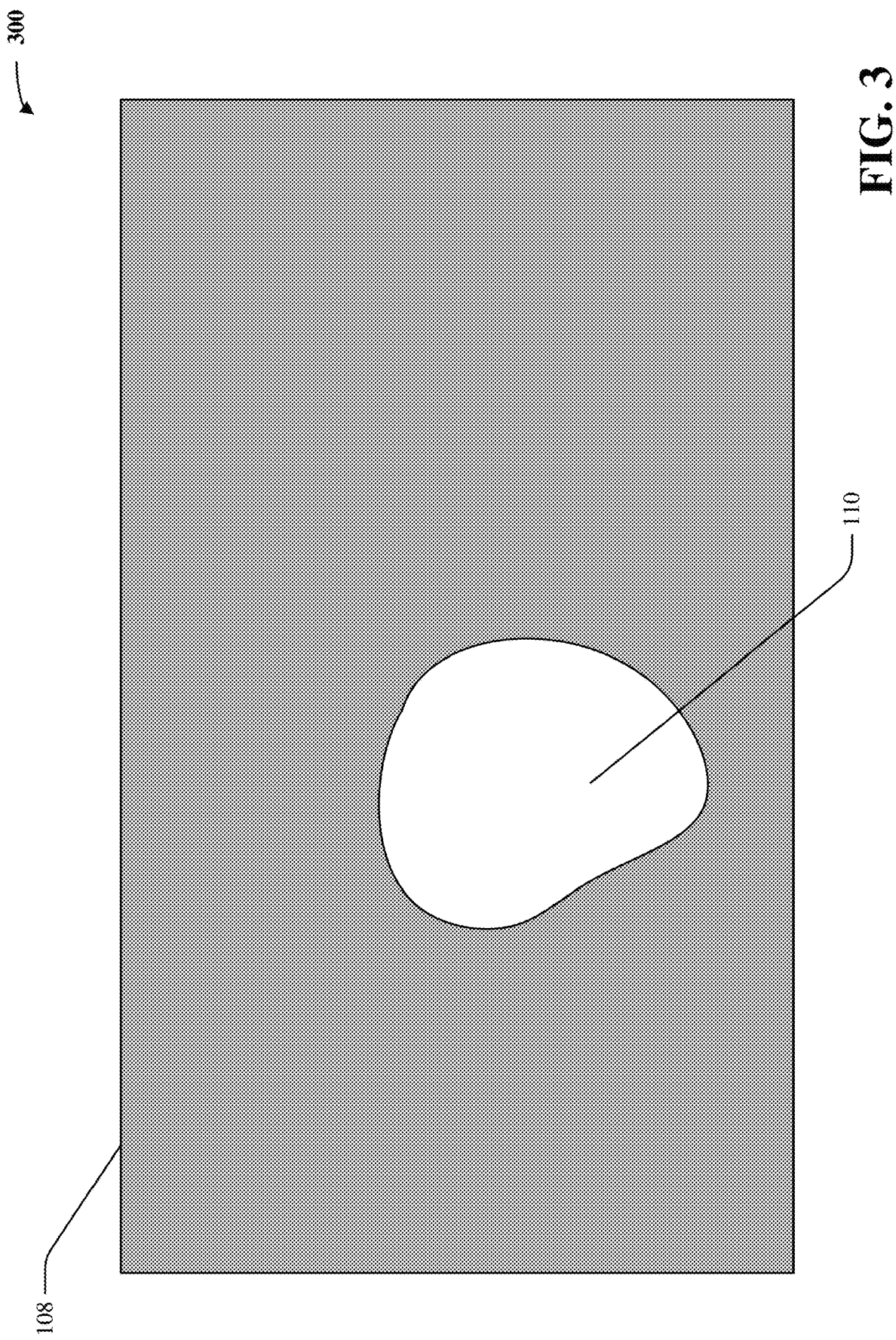
FIG. 3 illustrates an example, non-limiting block diagram of a segmentation mask in accordance with one or more embodiments described herein.

Various non-limiting aspects regarding the medical image 104 and the segmentation mask 108 are described with respect to FIGS. 2-3.

FIG. 2 illustrates an example, non-limiting block diagram 200 of the medical image 104 in accordance with one or more embodiments described herein.

As shown, the medical image 104 can be a two-dimensional pixel array that illustrates the anatomical structure 106. As also shown, the medical image 104 can illustrate any other suitable anatomical structures that might be near, around, or otherwise related to the anatomical structure 106. Indeed, in the non-limiting example of FIG. 2, the medical image 104 can be considered as illustrating a myometrium 202, an endometrium 204, and a uterine cavity 206. In such non-limiting example, the anatomical structure 106 can be considered as a fibroid that is embedded or otherwise growing within the myometrium 202. More specifically, the anatomical structure 106 can be considered as an intramural fibroid, as opposed to a submucosal fibroid. After all, the anatomical structure 106 can, in this non-limiting example, be located wholly within the myometrium 202 without bulging into the uterine cavity 206.

FIG. 3 illustrates an example, non-limiting block diagram 300 of the segmentation mask 108 in accordance with one or more embodiments described herein.

As shown, the segmentation mask 108, which can be a two-dimensional pixel array having the same size, format, or dimensionality as the non-limiting example of the medical image 104 shown in FIG. 2, can illustrate the segmentation class 110. As mentioned above, the segmentation class 110 can correspond to or otherwise represent the anatomical structure 106. Accordingly, because the anatomical structure 106 can, in this non-limiting example, be a fibroid embedded or growing within the myometrium 202, the segmentation class 110 can be considered as a fibroid class. In other words, if a given pixel (or voxel) of the segmentation mask 108 is a member of the segmentation class 110, then an identically-positioned pixel (or voxel) of the medical image 104 can be known or deemed to belong to the anatomical structure 106 (e.g., to belong to a fibroid region of the medical image 104).

In the non-limiting example of FIG. 3, the segmentation mask 108 can be a binary or dichotomous mask. That is, any pixel (or voxel) of the segmentation mask 108 that is not a member of the segmentation class 110 can be considered as being a member of a background class (e.g., denoted by gray in FIG. 3). However, this is a mere non-limiting example for ease of illustration. In various aspects, the segmentation mask 108 can be any suitable multi-chotomous mask. That is, the segmentation mask 108 can comprise n segmentation classes, for any suitable positive integer n≥2.

In any case, the segmentation mask 108 can be considered as a ground-truth annotation that is known or otherwise deemed to indicate where the anatomical structure 106 is located, depicted, or illustrated within the medical image 104.

Referring back to FIG. 1, it can be desired to augment the medical image 104 and the segmentation mask 108 in a biologically-substantive fashion without utilizing pre-made templates. As described herein, the anatomy-driven augmentation system 102 can facilitate such augmentation.

In various embodiments, the anatomy-driven augmentation system 102 can comprise a processor 112 (e.g., computer processing unit, microprocessor) and a non-transitory computer-readable memory 114 that is operably or operatively or communicatively connected or coupled to the processor 112. The non-transitory computer-readable memory 114 can store computer-executable instructions which, upon execution by the processor 112, can cause the processor 112 or other components of the anatomy-driven augmentation system 102 (e.g., access component 116, deformation component 118, training component 120) to perform one or more acts. In various embodiments, the non-transitory computer-readable memory 114 can store computer-executable components (e.g., access component 116, deformation component 118, training component 120), and the processor 112 can execute the computer-executable components.

In various embodiments, the anatomy-driven augmentation system 102 can comprise an access component 116. In various aspects, the access component 116 can electronically receive or otherwise electronically access the medical image 104 or the segmentation mask 108. In various instances, the access component 116 can electronically retrieve the medical image 104 or the segmentation mask 108 from any suitable centralized or decentralized data structures (not shown) or from any suitable centralized or decentralized computing devices (not shown). As a non-limiting example, whatever medical imaging device, equipment, or modality (e.g., CT scanner, MRI scanner, X-ray scanner, PET scanner, ultrasound scanner) that generated or captured the medical image 104 can transmit the medical image 104 or the segmentation mask 108 to the access component 116. In any case, the access component 116 can electronically obtain or access the medical image 104 or the segmentation mask 108, such that other components of the anatomy-driven augmentation system 102 can electronically interact with the medical image 104 or with the segmentation mask 108.

In various embodiments, the anatomy-driven augmentation system 102 can comprise a deformation component 118. In various aspects, as described herein, the deformation component 118 can electronically generate an augmented medical image and an augmented segmentation mask, by applying a continuous, zero boundary, non-rigid, and anatomy-driven deformation field to the medical image and to the segmentation mask.

In various embodiments, the anatomy-driven augmentation system 102 can comprise a training component 120. In various instances, as described herein, the training component 120 can electronically train a deep learning neural network, using the augmented medical image and the augmented segmentation mask.

Figure 4:
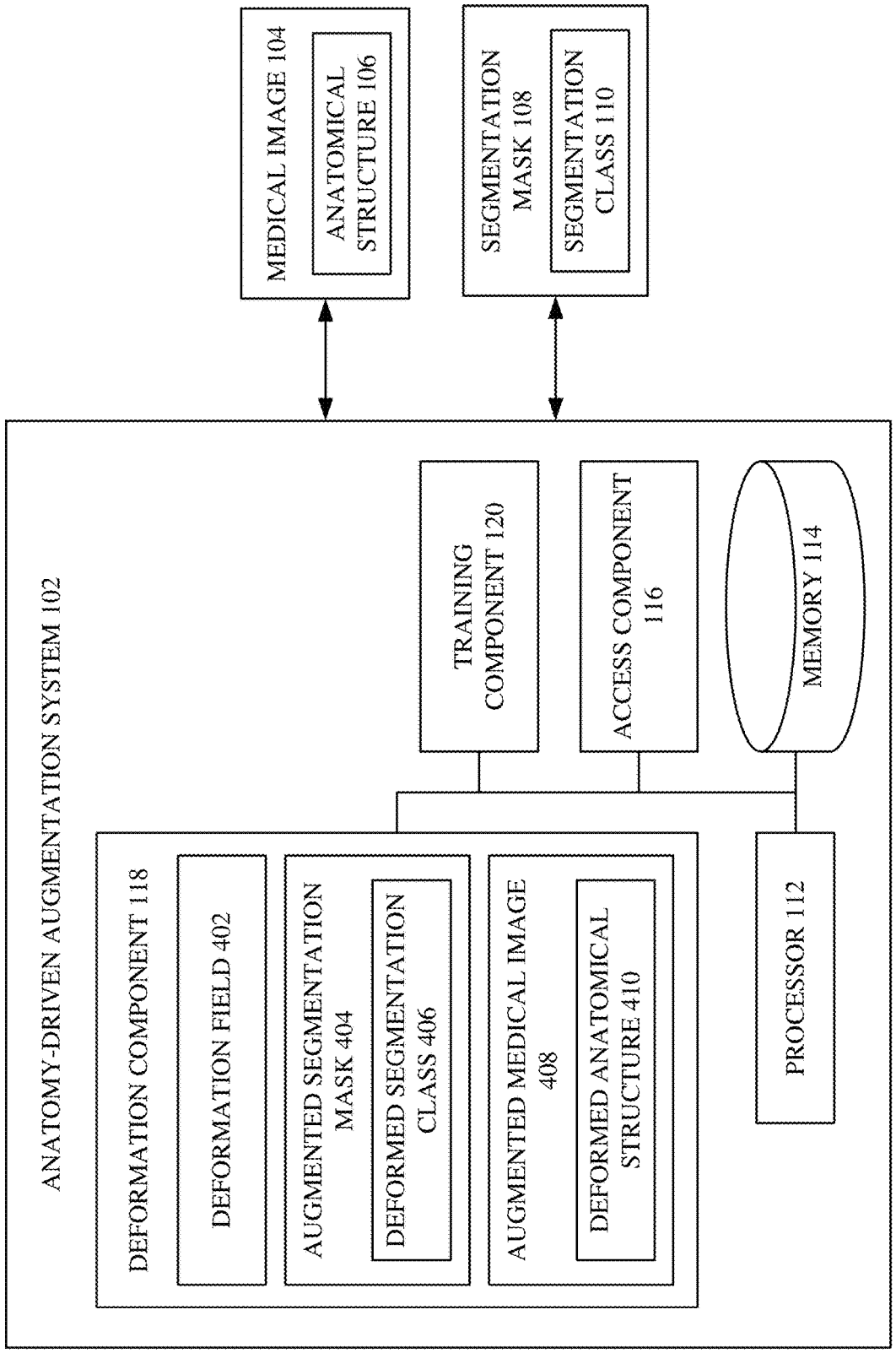
FIG. 4 illustrates a block diagram of an example, non-limiting system including a deformation field, an augmented segmentation mask, and an augmented medical image that facilitates anatomy-driven augmentation of medical images in accordance with one or more embodiments described herein.

FIG. 4 illustrates a block diagram of an example, non-limiting system 400 including a deformation field, an augmented segmentation mask, and an augmented medical image that can facilitate anatomy-driven augmentation of medical images in accordance with one or more embodiments described herein. As shown, the system 400 can, in some cases, comprise the same components as the system 100, and can further comprise a deformation field 402, an augmented segmentation mask 404, and an augmented medical image 408.

In various embodiments, the deformation component 118 can electronically generate, electronically control, or otherwise electronically access the deformation field 402. In various aspects, the deformation field 402 can be any suitable array of displacement vectors whose size, format, or dimensionality can correspond to and be smaller than the size, format, or dimensionality of the medical image 104 and of the segmentation mask 108.

As a non-limiting example, suppose that the medical image 104 and the segmentation mask 108 are both x-by-y pixel arrays. In such case, the deformation field 402 can be an a-by-b array of two-dimensional displacement vectors, for any suitable positive integers 1<a<x and 1<b<y. Furthermore, each of such two-dimensional displacement vectors can indicate or otherwise represent a direction in which and a distance by which a respective pixel of the medical image 104 and of the segmentation mask 108 can be spatially moved or shifted in two-dimensional space.

As another non-limiting example, suppose that the medical image 104 and the segmentation mask 108 are both x-by-y-by-z voxel arrays. In such case, the deformation field 402 can be an a-by-b-by-c array of three-dimensional displacement vectors, for any suitable positive integers 1<a<x, 1<b<y, and 1<c<z. Moreover, each of such three-dimensional displacement vectors can indicate or otherwise represent a direction in which and a distance by which a respective voxel of the medical image 104 and of the segmentation mask 108 can be spatially moved or shifted in three-dimensional space.

In various aspects, the deformation field 402 can be continuous, rather than discontinuous. In other words, the directions and magnitudes of the displacement vectors specified in the deformation field 402 can continuously or smoothly vary throughout the deformation field 402.

Furthermore, in various instances, a boundary condition of the deformation field 402 can be zero. That is, the deformation field 402 can have displacement vectors of zero magnitude along its outermost edges (e.g., if the medical image 104 and the segmentation mask 108 are pixel arrays) or outermost surfaces (e.g., if the medical image 104 and the segmentation mask 108 are voxel arrays). Accordingly, because the deformation field 402 can be continuous, such zero boundary condition can cause the magnitudes of the displacement vectors to smoothly taper to zero at the boundaries of the deformation field 402.

Further still, in various cases, the deformation field 402 can be non-rigid. In other words, the magnitudes and directions of the displacement vectors specified in the deformation field 402 can have any suitable uniform or non-uniform values (subject to the continuity condition and the zero boundary condition mentioned above). This can cause the deformation field 402 to: translate various illustrated objects to which the deformation field 402 is applied; rotate various illustrated objects to which the deformation field 402 is applied; expand or enlarge various illustrated objects to which the deformation field 402 is applied; contract or shrink various illustrated objects to which the deformation field 402 is applied; shear various illustrated objects to which the deformation field 402 is applied; or otherwise deform, warp, or distort various illustrated objects to which the deformation field 402 is applied.

Now, in various aspects, the deformation component 118 can electronically apply the deformation field 402 to the segmentation mask 108, which can yield the augmented segmentation mask 404. More specifically, the deformation component 118 can electronically distort, warp, or otherwise deform various pixels or voxels of the segmentation mask 108 according to the displacement vectors specified in the deformation field 402, and the result of such distortion, warping, or deformation can be considered as the augmented segmentation mask 404.

As mentioned above, the deformation field 402 can have a smaller size, format, or dimensionality than the segmentation mask 108. Accordingly, the deformation field 402 can encompass, cover, or otherwise affect less than an entirety of the segmentation mask 108. In particular, the deformation field 402 can be targeted at or about the segmentation class 110, such that the deformation field 402 can encompass, cover, or otherwise affect only: whatever pixels or voxels of the segmentation mask 108 belong to the segmentation class 110; and whatever pixels or voxels of the segmentation mask 108 are located within a surrounding periphery (e.g., within a threshold proximity) of the segmentation class 110. Thus, the deformation field 402 can deform the pixels or voxels that belong to the segmentation class 110, which can cause the segmentation class 110 to be spatially distorted into a deformed segmentation class 406. Various non-limiting aspects are described with respect to FIGS. 5-6.

Figure 5:
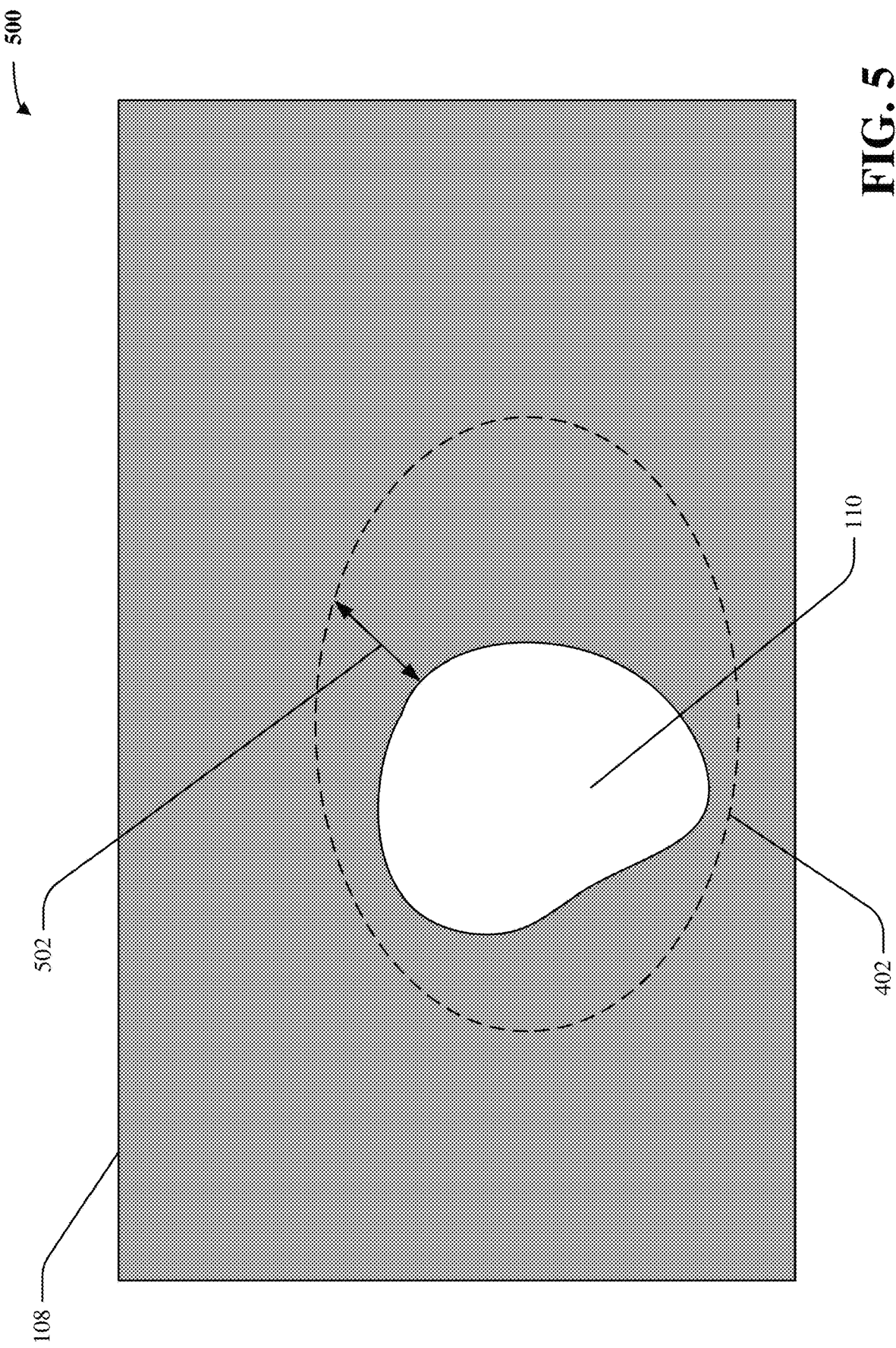
FIGS. 5-6 illustrate example, non-limiting block diagrams of a deformation field deforming a segmentation mask in accordance with one or more embodiments described herein.
Figure 6:
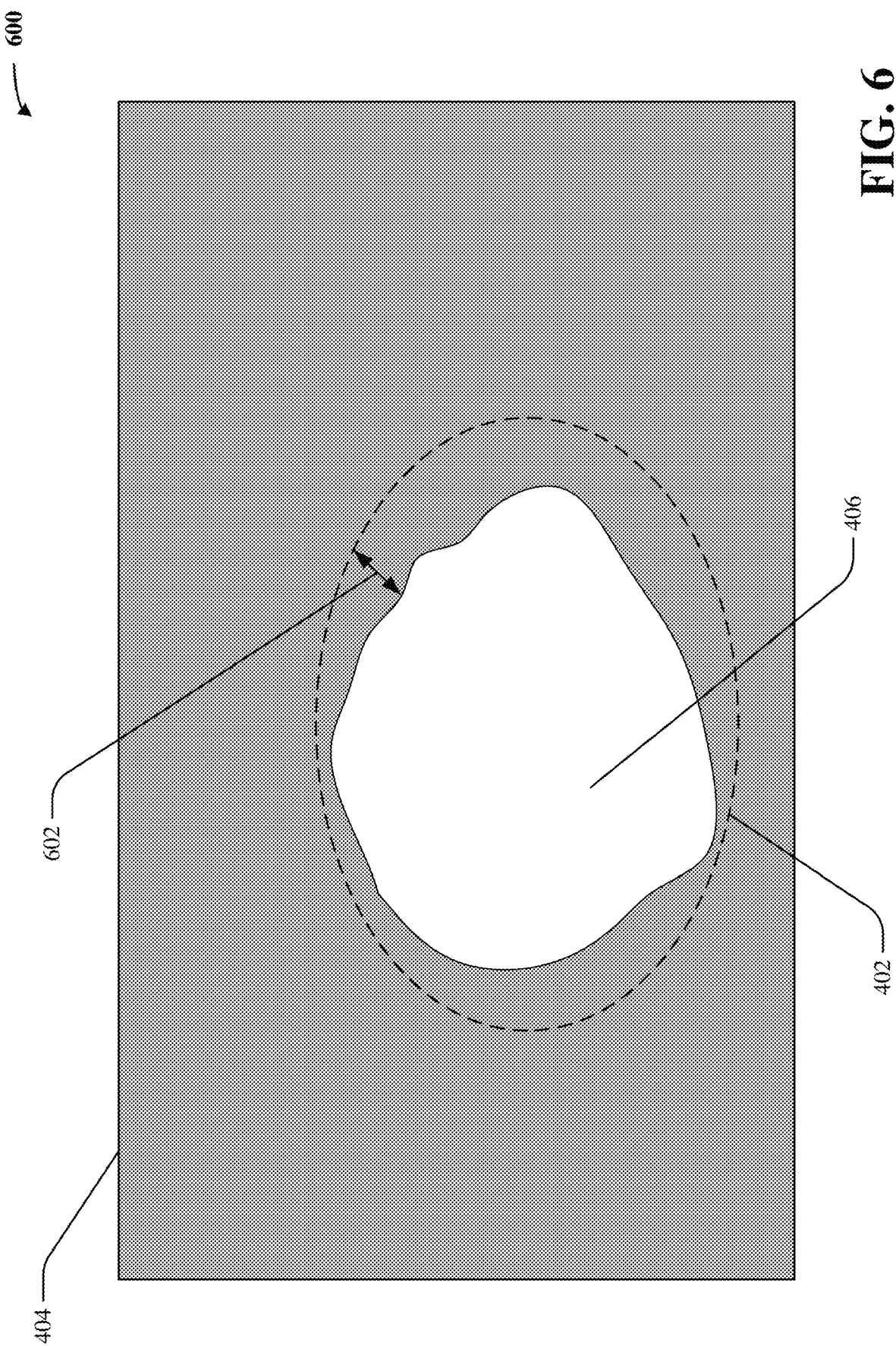

FIGS. 5-6 illustrate example, non-limiting block diagrams 500 and 600 of the deformation field 402 deforming the segmentation mask 108 in accordance with one or more embodiments described herein.

First, consider FIG. 5. As shown, and as mentioned above, some of the pixels (or voxels) of the segmentation mask 108 can be considered as belonging to a segmentation class 110 (e.g., a fibroid class) that corresponds to the anatomical structure 106, and the remainder of the pixels (or voxels) of the segmentation mask 108 can be considered as belonging to a background class (e.g., denoted in gray). As mentioned above, the deformation field 402 can exhibit a smaller size, format, or dimensionality than the segmentation mask 108, such that the deformation field 402 cannot affect every single pixel (or voxel) in the segmentation mask 108. Instead, the deformation field 402 can affect only a strict subset of the pixels (or voxels) of the segmentation mask 108. For purposes of illustration and explanation, the deformation field 402 can, as shown, be overlaid on top of the segmentation mask 108, so as to visually indicate which pixels (or voxels) of the segmentation mask 108 are to be affected by the deformation field 402.

In the non-limiting example of FIG. 5, the deformation field 402 is overlaid on top of the segmentation mask 108, so as to encompass or otherwise cover: the segmentation class 110; and a surrounding periphery 502 of the segmentation class 110. In various aspects, the surrounding periphery 502, with respect to the segmentation mask 108, can be considered as being or including whatever pixels (or voxels) of the segmentation mask 108 that are not members of the segmentation class 110 but that are nevertheless encompassed or covered by the deformation field 402. In the non-limiting example of FIG. 5, the surrounding periphery 502 can be considered as being a portion of the background class that surrounds, is adjacent to, or is otherwise within any suitable threshold proximity of the segmentation class 110.

Although FIG. 5 shows the deformation field 402 as having an oval or elliptical shape, this is a mere non-limiting example for ease of illustration. In various aspects, the deformation field 402 can exhibit any suitable shape, whether regular or irregular).

In any case, the deformation component 118 can warp the segmentation class 110 and the pixels (or voxels) of the segmentation mask 108 that are located within the surrounding periphery 502, according to the displacement vectors specified in the deformation field 402. The result of such warping can be the augmented segmentation mask 404, as shown in FIG. 6.

Indeed, as shown in FIG. 6, the augmented segmentation mask 404 can be considered as depicting the deformed segmentation class 406. In various aspects, the deformed segmentation class 406 can be considered as a spatially distorted or warped version of the segmentation class 110 (e.g., can be considered as a distorted fibroid class). In the non-limiting example shown in FIG. 6, the deformed segmentation class 406 is spatially larger than the segmentation class 110. Accordingly, the deformation field 402 can be considered as having enlarged or expanded the segmentation class 110. However, this is a mere non-limiting example. In other cases, the deformation field 402 can have contracted or shrunk the segmentation class 110. In even other cases, the deformation field 402 can have rotated or translated the segmentation class 110. In still other cases, the deformation field 402 can have sheared the segmentation class 110. In yet other cases, the deformation field 402 can have caused any suitable combination of expansion, contraction, rotation, translation, or shearing to have been performed on the segmentation class 110.

In various aspects, the deformation field 402 can also have distorted, warped, or otherwise deformed the surrounding periphery 502, thereby yielding a deformed surrounding periphery 602. In various instances, because the deformation field 402 can be continuous and can have a zero boundary condition, the deformation field 402 can have distorted, warped, or otherwise deformed the surrounding periphery 502 commensurately or quasi-inversely with the segmentation class 110. Indeed, in the non-limiting example of FIG. 6, the deformation field 402 can have expanded the segmentation class 110 to create the deformed segmentation class 406. As shown, commensurately with this expansion, the deformation field 402 can have contracted or shrunk the surrounding periphery 502 to create the deformed surrounding periphery 602. In other words, it can be as if expansion of the segmentation class 110 caused portions of the surrounding periphery 502 to be compressed or pushed out of the way. Again, this is a mere non-limiting example for ease of illustration. In various other instances, the deformation field 402 can instead have contracted the segmentation class 110, in which case the deformation field 402 would have commensurately expanded the surrounding periphery 502.

In any case, the deformation field 402 can have warped the segmentation class 110 into the deformed segmentation class 406, and the deformation field 402 can have commensurately warped the surrounding periphery 502 into the deformed surrounding periphery 602. However, in various aspects, any pixels (or voxels) of the segmentation mask 108 that are not encompassed, covered, or otherwise affected by the deformation field 402 can remain unchanged in the augmented segmentation mask 404. In other words, any pixels (or voxels) of the augmented segmentation mask 404 that are located outside of the deformation field 402 can be the same as those pixels (or voxels) were in the segmentation mask 108.

Now, in various aspects, the deformation component 118 can electronically apply the deformation field 402 to the medical image 104, which can yield the augmented medical image 408. More specifically, the deformation component 118 can electronically distort, warp, or otherwise deform various pixels or voxels of the medical image 104 according to the displacement vectors specified in the deformation field 402, and the result of such distortion, warping, or deformation can be considered as the augmented medical image 408.

In various aspects, the deformation component 118 can apply the deformation field 402 to the medical image 104 in the same way (e.g., with the same intra-image positioning) as the deformation component 118 applied it to the segmentation mask 108. That is, because the deformation field 402 as applied to the segmentation mask 108 can have been targeted at or about the segmentation class 110, and because the segmentation class 110 can correspond to the anatomical structure 106, the deformation field 402 as applied to the medical image 104 can be targeted at or about the anatomical structure 106. In various instances, this can cause the deformation field 402 to encompass, cover, or otherwise affect only: whatever pixels or voxels of the medical image 104 belong to the anatomical structure 106; and whatever pixels or voxels of the medical image 104 are located within a surrounding periphery (e.g., within a threshold proximity) of the anatomical structure 106. Thus, the deformation field 402 can deform the pixels or voxels that belong to the anatomical structure 106, which can cause the anatomical structure 106 to be spatially distorted into a deformed anatomical structure 410. Various non-limiting aspects are described with respect to FIGS. 7-8.

Figure 7:
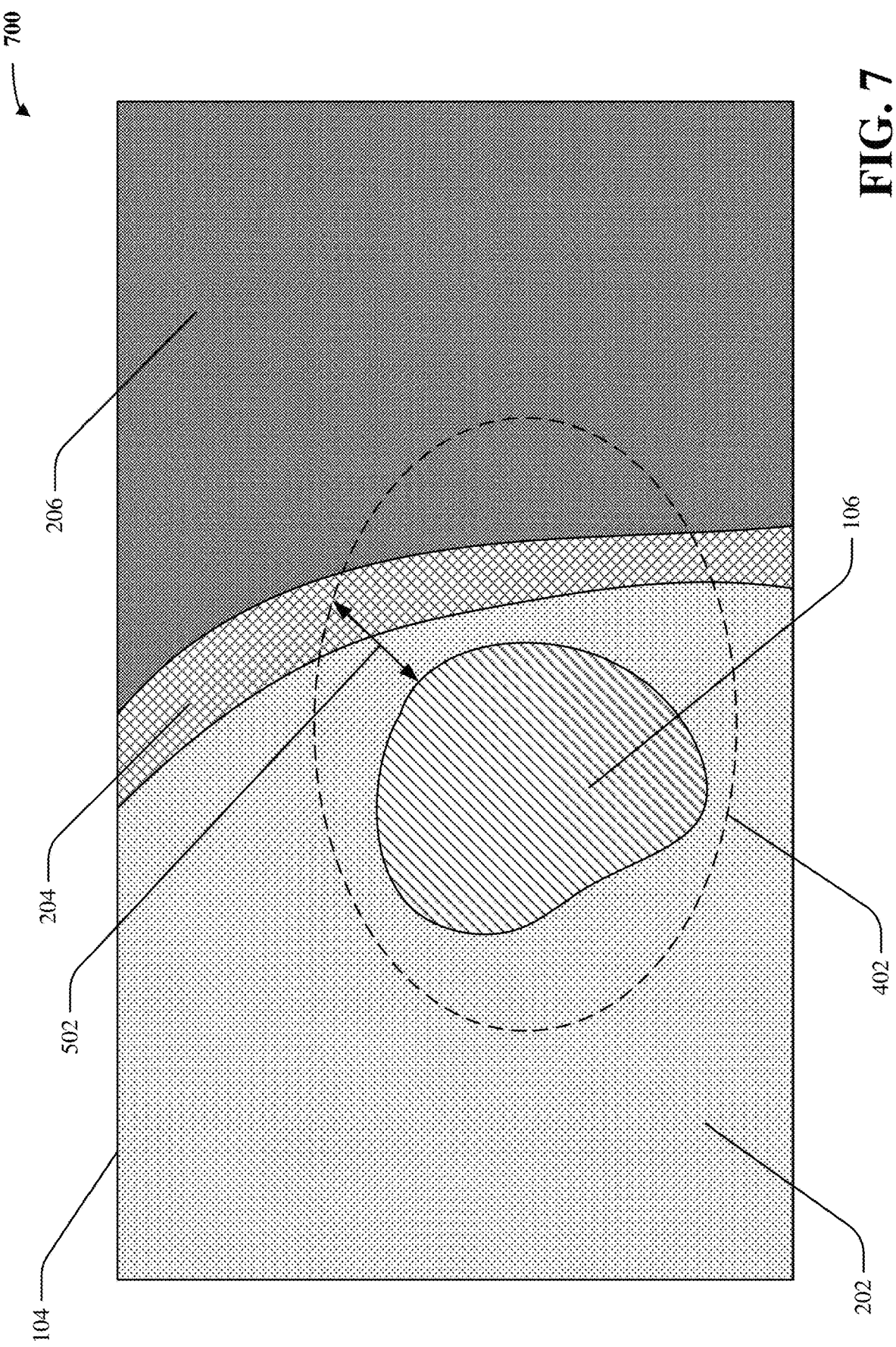
FIGS. 7-8 illustrate example, non-limiting block diagrams of a deformation field deforming a medical image in accordance with one or more embodiments described herein.
Figure 8:
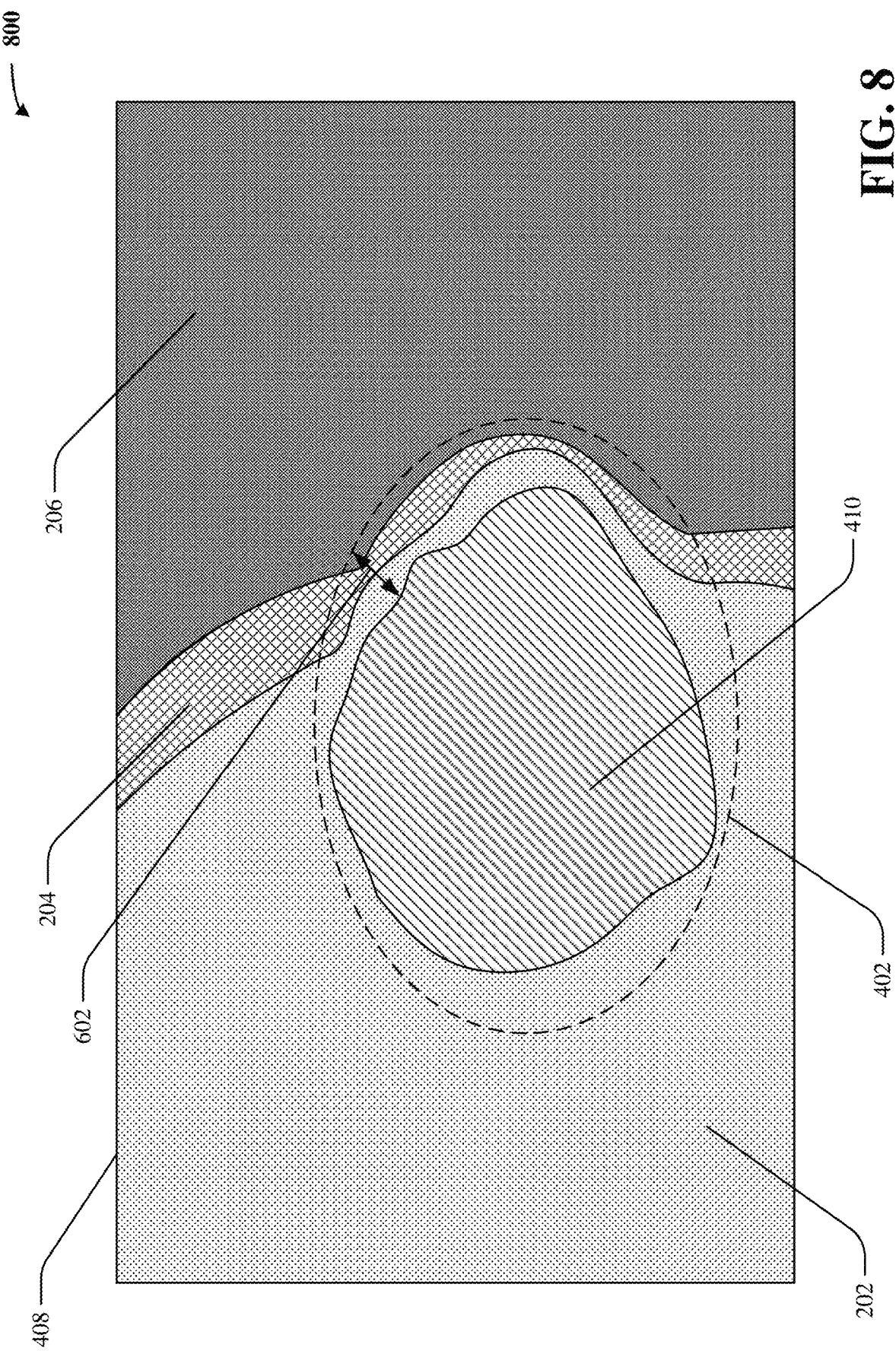

FIGS. 7-8 illustrate example, non-limiting block diagrams 700 and 800 of the deformation field 402 deforming the medical image 104 in accordance with one or more embodiments described herein.

First, consider FIG. 7. As shown, and as mentioned above, the medical image 104 can, in a non-limiting example, illustrate the myometrium 202, the endometrium 204, and the uterine cavity 206, where the anatomical structure 106 can be considered as a fibroid that is embedded or growing within the myometrium 202. As mentioned above, the deformation component 118 can apply the deformation field 402 to the medical image 104 at the same intra-image location at which it was applied to the segmentation mask 108. For purposes of illustration and explanation, the deformation field 402 can, as shown, be overlaid on top of the medical image 104, so as to visually indicate which pixels (or voxels) of the segmentation mask 108 are to be affected by the deformation field 402.

In the non-limiting example of FIG. 7, the deformation field 402 is overlaid on top of the medical image 104 in the same location and orientation at which it was overlaid on top of the segmentation mask 108. Accordingly, as shown, the deformation field 402 can encompass or otherwise cover: the anatomical structure 106; and the surrounding periphery 502. Just like as mentioned above, the surrounding periphery 502, with respect to the medical image 104, can be considered as being or including whatever pixels (or voxels) of the medical image 104 that do not belong to the anatomical structure 106 but that are nevertheless encompassed or covered by the deformation field 402. In other words, the surrounding periphery 502 can be considered as being or including whatever pixels (or voxels) of the medical image 104 that surround, that are adjacent to, or that are otherwise within any suitable threshold proximity of the anatomical structure 106. In the non-limiting example of FIG. 6, the surrounding periphery 502 can be considered as containing a portion of the myometrium 202, a portion of the endometrium 204, and a portion of the uterine cavity 206.

In any case, the deformation component 118 can warp the anatomical structure 106 and the pixels (or voxels) of the medical image 104 that are located in the surrounding periphery 502, according to the displacement vectors specified in the deformation field 402. The result of such warping can be the augmented medical image 408, as shown in FIG. 8.

Indeed, as shown in FIG. 8, the augmented medical image 408 can be considered as depicting the deformed anatomical structure 410. In various aspects, the deformed anatomical structure 410 can be considered as a spatially distorted or warped version of the anatomical structure 106 (e.g., can be considered as a distorted fibroid region). In various aspects, the deformation field 402 can distort, warp, or otherwise deform the anatomical structure 106 in the same fashion as it did to the segmentation class 110. Accordingly, because the deformation field 402 can have caused the segmentation class 110 to be enlarged or expanded as shown in FIGS. 6-7, the deformation field 402 can thus cause the anatomical structure 106 to be identically enlarged or expanded. However, this is a mere non-limiting example. If the deformation field 402 instead caused the segmentation class 110 to be contracted, shrunk, rotated, translated, or sheared, then the deformation field 402 can have caused the anatomical structure 106 to be identically contracted, shrunk, rotated, translated, or sheared.

In various aspects, the deformation field 402 can also have distorted, warped, or otherwise deformed the surrounding periphery 502, so as to create the deformed surrounding periphery 602. As mentioned above, because the deformation field 402 can be continuous and can have a zero boundary condition, the deformation field 402 can have distorted, warped, or otherwise deformed the surrounding periphery 502, and any objects depicted within the surrounding periphery 502, commensurately or quasi-inversely with the anatomical structure 106. Indeed, in the non-limiting example of FIG. 8, the deformation field 402 can have expanded the anatomical structure 106 to create the deformed anatomical structure 410. Accordingly, and commensurately with such expansion, the deformation field 402 can have contracted or shrunk the surrounding periphery 502, and any objects depicted within the surrounding periphery 502, so as to create the deformed surrounding periphery 602. In particular, as shown, deformation field 402 can have commensurately distorted, warped, or otherwise deformed the portion of the myometrium 202 that is located within the surrounding periphery 502, the portion of the endometrium 204 that is located within the surrounding periphery 502, and the portion of the uterine cavity 206 that is located within the surrounding periphery 502. In other words, it can be as if expansion of the anatomical structure 106 physically compressed or pushed that portion of the myometrium 202, that portion of the endometrium 204, and that portion of the uterine cavity 206 out of the way. In still other words, it can be as if the anatomical structure 106 plausibly or realistically interacted with that portion of the myometrium 202, with that portion of the endometrium 204, and with that portion of the uterine cavity 206 during expansion. In various cases, such biologically realistic or plausible interactions between the anatomical structure 106, that portion of the myometrium 202, that portion of the endometrium 204, and that portion of the uterine cavity 206 can be caused by the deformation field 402 being continuous and having a zero boundary condition.

Note that, as mentioned above, the anatomical structure 106 can, in the non-limiting examples of FIGS. 2 and 7, be considered as an intramural fibroid. In contrast, note that the deformed anatomical structure 410 can, in the non-limiting example of FIG. 8, be considered as a submucosal fibroid. After all, the anatomical structure 106 can be wholly within the myometrium 202, whereas the deformed anatomical structure 410 can instead be realistically bulging outward into the uterine cavity 206. In other words, the deformation field 402 can have changed the anatomical structure 106 in a biologically substantive fashion.

In any case, the deformation field 402 can have warped the anatomical structure 106 into the deformed anatomical structure 410, and the deformation field 402 can have commensurately warped the surrounding periphery 502 into the deformed surrounding periphery 602. However, in various aspects and just as above, any pixels (or voxels) of the medical image 104 that are not encompassed, covered, or otherwise affected by the deformation field 402 can remain unchanged in the augmented medical image 408. In other words, any pixels (or voxels) of the augmented medical image 408 that are located outside of the deformation field 402 can be the same as those pixels (or voxels) were in the medical image 104 (e.g., whatever portions of the myometrium 202, of the endometrium 204, and of the uterine cavity 206 that are located outside of the deformation field 402 can remain unchanged).

Accordingly, the deformation component 118 can generate the augmented segmentation mask 404 by applying the deformation field 402 to the segmentation mask 108, and the deformation component 118 can likewise generate the augmented medical image 408 by identically applying the deformation field 402 to the medical image 104. Because the segmentation mask 108 can already have been considered as a ground-truth annotation corresponding to the medical image 104, and because both the augmented segmentation mask 404 and the augmented medical image 408 can have been generated by the deformation field 402, the augmented segmentation mask 404 can be considered as a ground-truth annotation corresponding to the augmented medical image 408. In other words, the augmented segmentation mask 404 can be considered as indicating which pixels or voxels of the augmented medical image 408 belong to or are otherwise part of the deformed anatomical structure 410.

Figure 9:
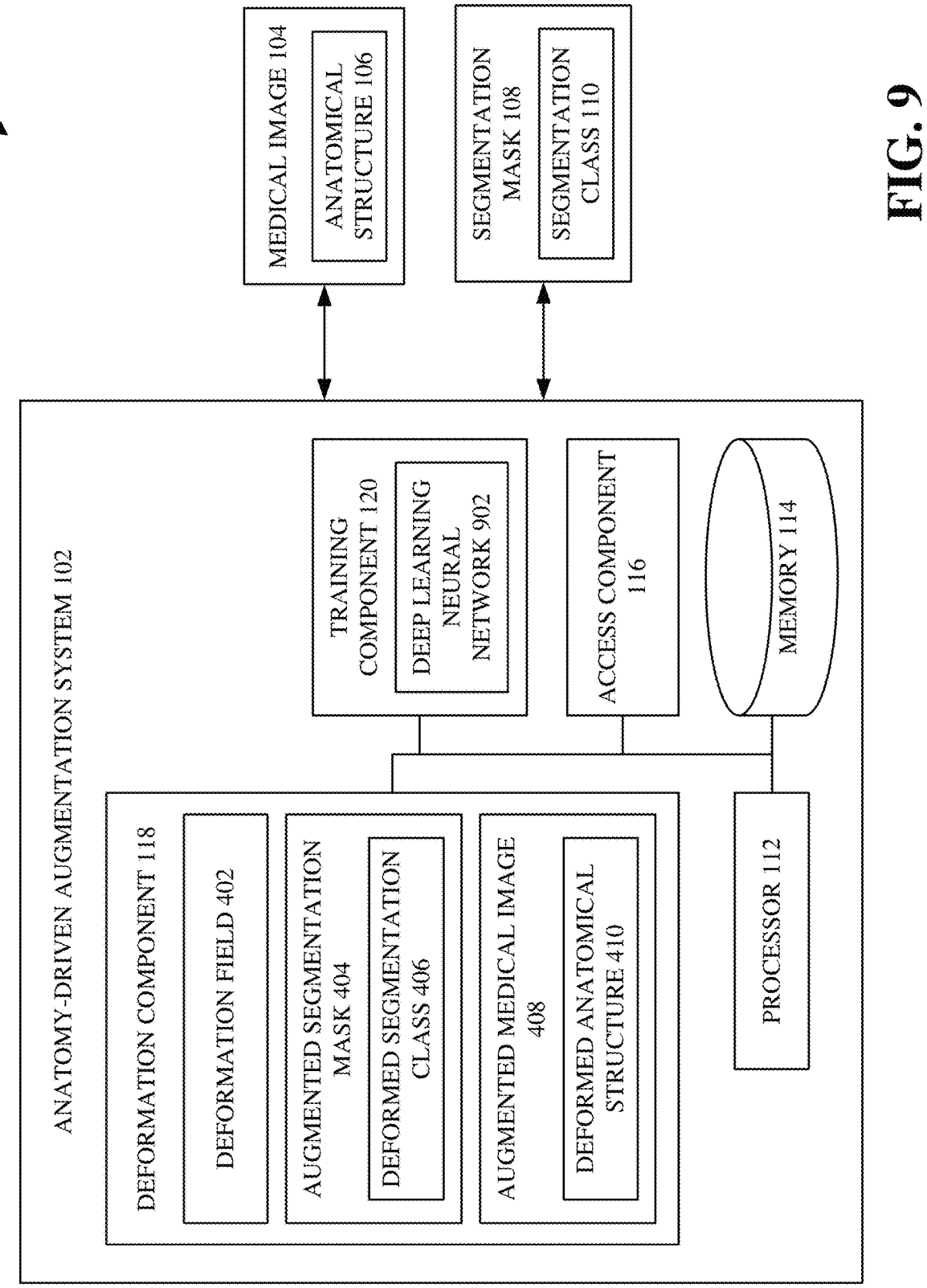
FIG. 9 illustrates a block diagram of an example, non-limiting system including a deep learning neural network that can be trained on medical images and segmentation masks that have been augmented in an anatomy-driven fashion in accordance with one or more embodiments described herein.

FIG. 9 illustrates a block diagram of an example, non-limiting system 900 including a deep learning neural network 902 that can be trained on medical images and segmentation masks that have been augmented in an anatomy-driven fashion in accordance with one or more embodiments described herein. As shown, the system 900 can, in some cases, comprise the same components as the system 400, and can further comprise a deep learning neural network 902.

In various embodiments, the training component 120 can electronically store, electronically maintain, electronically control, or otherwise electronically access the deep learning neural network 902. In various aspects, the deep learning neural network 902 can have or otherwise exhibit any suitable internal architecture. For instance, the deep learning neural network 902 can have an input layer, one or more hidden layers, and an output layer. In various cases, any of such layers can be coupled together by any suitable interneuron connections or interlayer connections (e.g., forward connections, skip connections, recurrent connections). Furthermore, in various aspects, any of such layers can be any suitable types of neural network layers having any suitable learnable or trainable internal parameters (e.g., any of such input layer, one or more hidden layers, or output layer can be convolutional layers having trainable convolutional kernels, dense layers having trainable weight matrices or bias values, or batch normalization layers having trainable shift factors or scale factors). Further still, in various cases, any of such layers can be any suitable types of neural network layers having any suitable fixed or non-trainable internal parameters (e.g., any of such input layer, one or more hidden layers, or output layer can be non-linearity layers, padding layers, pooling layers, or concatenation layers).

Figure 10:
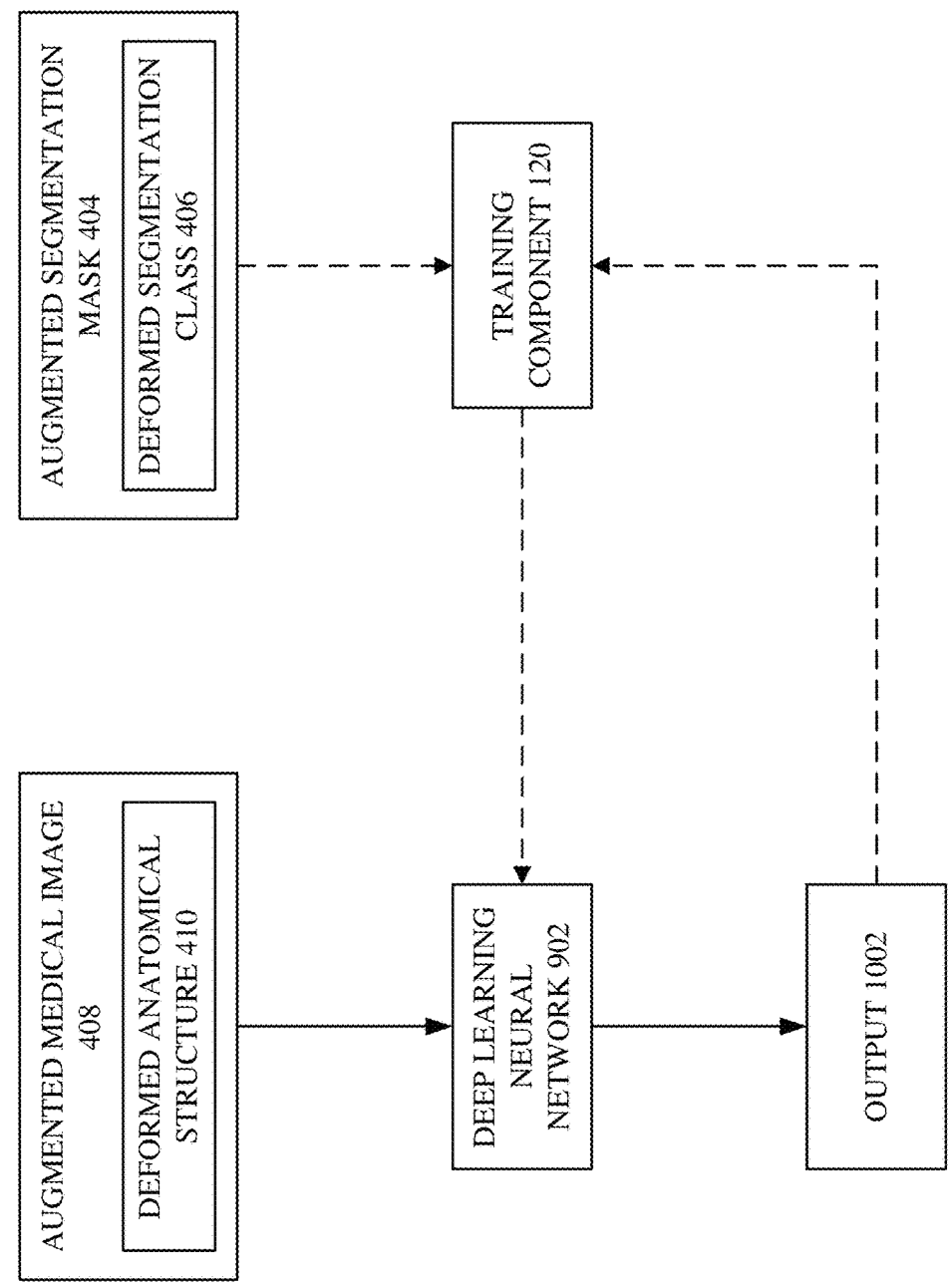
FIG. 10 illustrates an example, non-limiting block diagram showing how a deep learning neural network can be trained in accordance with one or more embodiments described herein.

In any case, the training component 120 can train the deep learning neural network 902 using the augmented segmentation mask 404 and the augmented medical image 408, as described with respect to FIG. 10.

FIG. 10 illustrates an example, non-limiting block diagram 1000 showing how the deep learning neural network 902 can be trained in accordance with one or more embodiments described herein.

In various aspects, the training component 120 can, prior to beginning training, initialize in any suitable fashion (e.g., random initialization) the trainable internal parameters (e.g., convolutional kernels, weight matrices, bias values) of the deep learning neural network 902.

In various instances, the training component 120 can execute the deep learning neural network 902 on the augmented medical image 408, thereby causing the deep learning neural network 902 to produce an output 1002. More specifically, the training component 120 can feed the augmented medical image 408 to an input layer of the deep learning neural network 902, the augmented medical image 408 can complete a forward pass through one or more hidden layers of the deep learning neural network 902, and an output layer of the deep learning neural network 902 can compute the output 1002 based on activation maps generated by the one or more hidden layers of the deep learning neural network 902.

Note that, in various aspects, the dimensionality of the output 1002 can be controlled or otherwise determined by the number or neurons (or by the sizes of other trainable internal parameters, such as convolutional kernels) in the output layer of the deep learning neural network 902. That is, a desired dimensionality of the output 1002 can be achieved by adding neurons to or removing neurons from (or otherwise altering the sizes of trainable internal parameters, such as convolutional kernels, of) the output layer of the deep learning neural network 902.

In various aspects, the output 1002 can be considered as the predicted or inferred segmentation mask which the deep learning neural network 902 determines should correspond to the augmented medical image 408. In contrast, the augmented segmentation mask 404 can be considered as the correct or accurate ground-truth that is known or deemed to correspond to the augmented medical image 408. Note that, if the deep learning neural network 902 has so far undergone no or little training, then the output 1002 can be very inaccurate. That is, the output 1002 can be quite different (e.g., as measured by any suitable metric) from the augmented segmentation mask 404.

In any case, the training component 120 can compute one or more errors or losses (e.g., MAE, MSE, cross-entropy) between the output 1002 and the augmented segmentation mask 404. In various instances, the training component 120 can incrementally update, via backpropagation, the trainable internal parameters of the deep learning neural network 902, based on such computed errors or losses.

Thus far, the anatomy-driven augmentation system 102 has mainly been described as performing augmentation on a single image-mask pair (e.g., on 104 and 108). However, this is a mere non-limiting example for ease of explanation and illustration. In various instances, the anatomy-driven augmentation system 102 can perform anatomy-driven augmentation as described herein with respect to any suitable number of image-mask pairs. In other words, the anatomy-driven augmentation system 102 can, in some cases, generate or otherwise enrich an entire training dataset, and the training component 120 can train the deep learning neural network 902 on that training dataset. In such case, the training component 120 can implement any suitable training batch sizes, any suitable training termination criteria, or any suitable error/loss functions.

Figure 11:
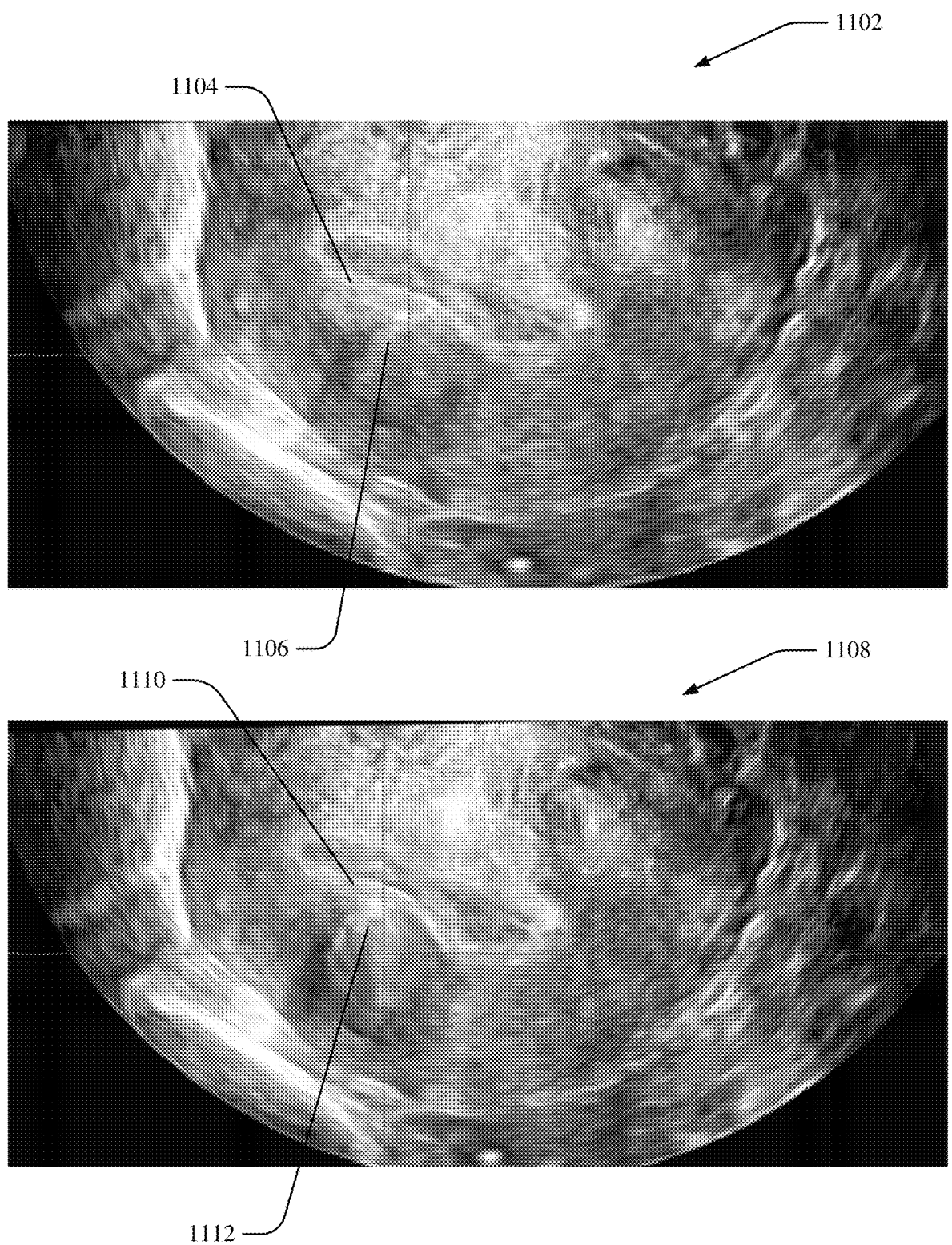
FIGS. 11-12 illustrate example, non-limiting experimental results in accordance with one or more embodiments described herein.
Figure 12:
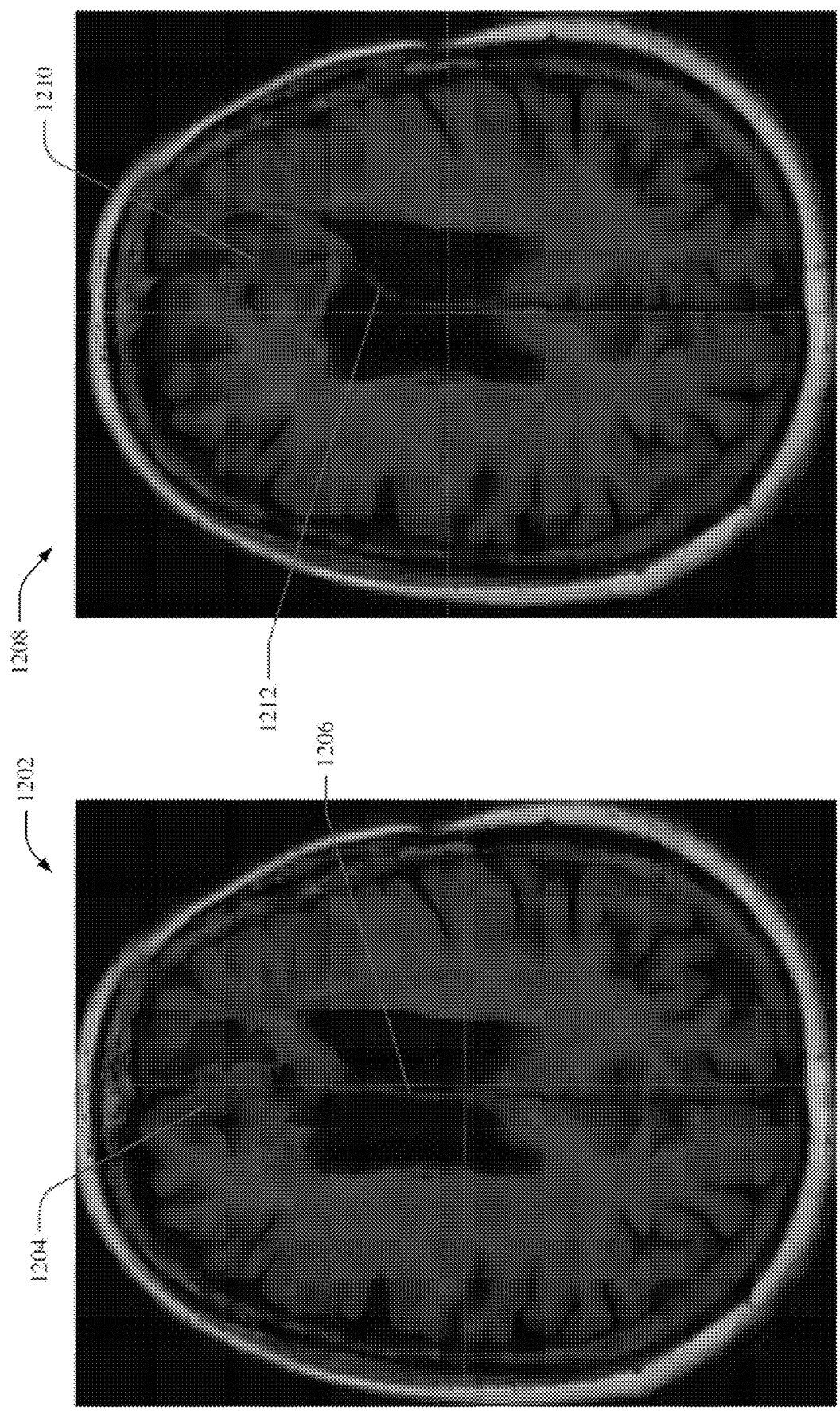

FIGS. 11-12 illustrate example, non-limiting experimental results in accordance with one or more embodiments described herein. In other words, various non-limiting examples described herein were reduced to practice by the present inventors and were used to augment real-world medical images, and some of such augmented real-world medical images are shown in FIGS. 11-12.

First, consider FIG. 11. FIG. 11 includes a trans-vaginal ultrasound scanned image 1102 of a uterus of a medical patient. As can be seen in the trans-vaginal ultrasound scanned image 1102, the uterus of the medical patient has an endometrium 1104 and a fibroid 1106 that is adjacent to the endometrium 1104. Note that the fibroid 1106 is not yet impinging upon the endometrium 1104. Accordingly, the fibroid 1106 can be classified as intramural.

In various aspects, anatomy-driven augmentation as described herein was performed on the trans-vaginal ultrasound scanned image 1102, thereby yielding an augmented trans-vaginal ultrasound scanned image 1108. In particular, a continuous, zero boundary, non-rigid deformation field was targeted at or about the fibroid 1106 and a surrounding periphery of the fibroid 1106, where at least some of the endometrium 1104 was located within the surrounding periphery. As can be seen in the augmented trans-vaginal ultrasound scanned image 1108, the uterus of the medical patient now has a deformed endometrium 1110 and a deformed fibroid 1112. The deformed fibroid 1112 can be considered as an enlarged version of the fibroid 1106. In contrast, the deformed endometrium 1110 can be considered as a contracted or impinged version of the endometrium 1104. In other words, anatomy-driven augmentation as described herein caused the fibroid 1106 to expand and the endometrium 1104 to commensurately contract out of the way, as if the fibroid 1106 had realistically grown and pressed upward against the endometrium 1104. Accordingly, the deformed fibroid 1112 can be classified as submucosal, instead of intramural.

Next, consider FIG. 12. FIG. 12 includes an MRI scanned image 1202 of a brain of a medical patient. As can be seen in the MRI scanned image 1202, the brain of the medical patient has a tumor 1204 and a corpus callosum 1206 that is coupled to the tumor 1204.

In various aspects, anatomy-driven augmentation as described herein was performed on the MRI scanned image 1202, thereby yielding an augmented MRI scanned image 1208. In particular, a continuous, zero boundary, non-rigid deformation field was targeted at or about the tumor 1204 and a surrounding periphery of the tumor 1204, where at least some of the corpus callosum 1206 was located within the surrounding periphery. As can be seen in the augmented MRI scanned image 1208, the brain of the medical patient now has a deformed tumor 1210 and a deformed corpus callosum 1212. The deformed tumor 1210 can be considered as an enlarged and translated version of the tumor 1204. In contrast, the deformed corpus callosum 1212 can be considered as a bent and translated version of the corpus callosum 1206. In other words, anatomy-driven augmentation as described herein caused the tumor 1204 to expand and shift and also caused the corpus callosum 1206 to commensurately bend out of the way, as if the tumor 1204 had realistically grown and pressed sideways against the corpus callosum 1206.

As FIG. 11-12 show, various embodiments described herein can be implemented to generate plausible, realistic, and biologically-substantive augmentations in medical images.

Figure 13:
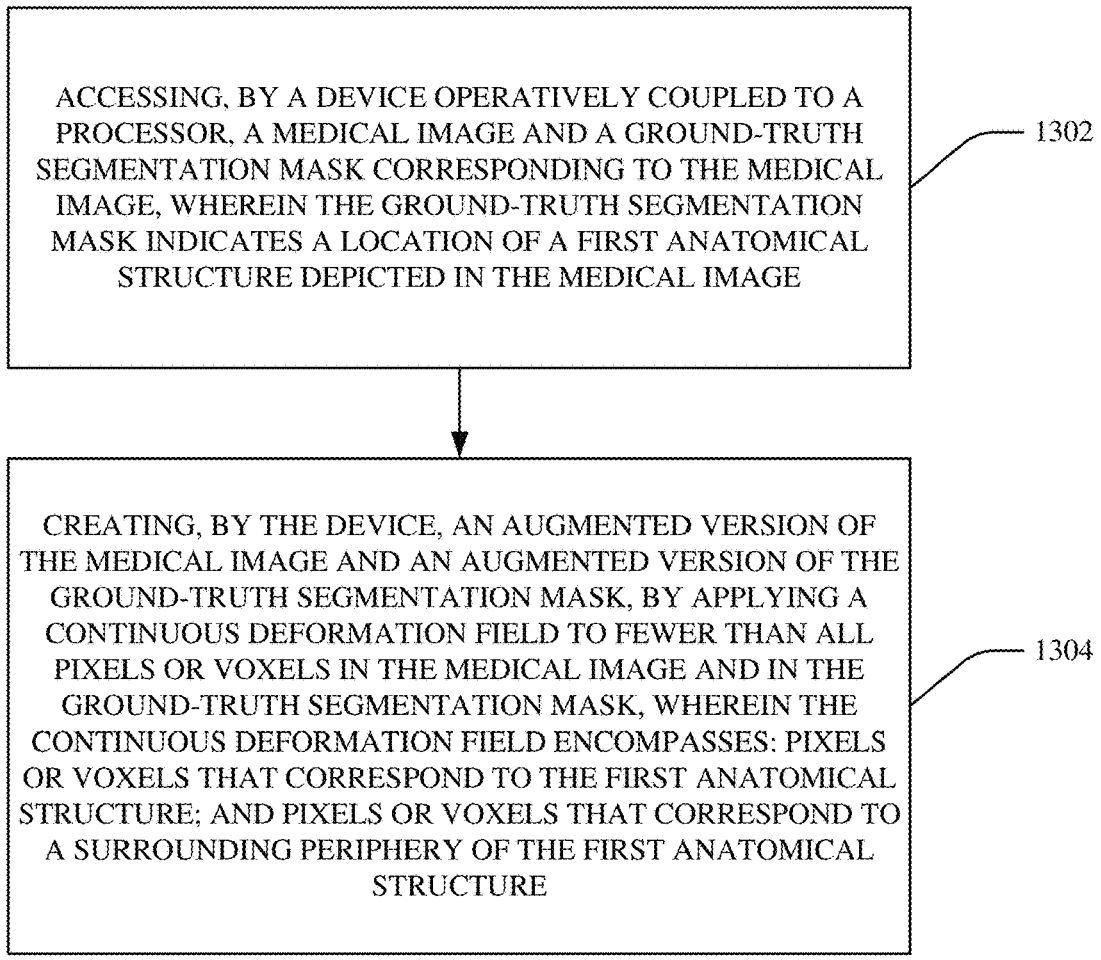
FIG. 13 illustrates a flow diagram of an example, non-limiting computer-implemented method that facilitates anatomy-driven augmentation of medical images in accordance with one or more embodiments described herein.

FIG. 13 illustrates a flow diagram of an example, non-limiting computer-implemented method 1300 that can facilitate anatomy-driven augmentation of medical images in accordance with one or more embodiments described herein. In various cases, the anatomy-driven augmentation system 102 can facilitate the computer-implemented method 1300.

In various embodiments, act 1302 can include accessing, by a device (e.g., 116) operatively coupled to a processor (e.g., 112), a medical image (e.g., 104) and a ground-truth segmentation mask (e.g., 108) corresponding to the medical image, wherein the ground-truth segmentation mask can indicate a location of a first anatomical structure (e.g., 106) depicted in the medical image.

In various aspects, act 1304 can include creating, by the device (e.g., via 118), an augmented version of the medical image (e.g., 408) and an augmented version of the ground-truth segmentation mask (e.g., 404), by applying a continuous deformation field (e.g., 402) to fewer than all pixels or voxels in the medical image and in the ground-truth segmentation mask. In various cases, the continuous deformation field can encompass: pixels or voxels that correspond to the first anatomical structure; and pixels or voxels that correspond to a surrounding periphery (e.g., 502) of the first anatomical structure (e.g., as shown in FIGS. 5-8).

Although not explicitly shown in FIG. 13, at least a portion of a second anatomical structure (e.g., 202, 204, 206) can be depicted within the surrounding periphery of the first anatomical structure, such that the continuous deformation field can deform the portion of the second anatomical structure commensurately with the first anatomical structure (e.g., as shown in FIG. 8). In some cases, the medical image can be a magnetic resonance imaging scan of a brain (e.g., 1202), the first anatomical structure can be a brain tumor (e.g., 1204), and the second anatomical structure can be a corpus callosum (e.g., 1206) of the brain. In other cases, the medical image can be a trans-vaginal ultrasound scan (e.g., 1102), the first anatomical structure can be a fibroid (e.g., 1106), and the second anatomical structure can be an endometrium (e.g., 1104).

Although not explicitly shown in FIG. 13, the computer-implemented method 1300 can comprise training, by the device (e.g., via 120), a deep learning neural network (e.g., 902) on the augmented version of the medical image and the augmented version of the ground-truth segmentation mask (e.g., as shown in FIG. 10).

Although not explicitly shown in FIG. 13, the continuous deformation field can taper to zero at its boundary.

Although not explicitly shown in FIG. 13, the continuous deformation field can cause the first anatomical structure or the surrounding periphery of the first anatomical structure to expand, contract, translate, rotate, or shear.

Various embodiments described herein can include a computer program product for facilitating anatomy-driven augmentation of medical images. In various aspects, the computer program product can comprise a non-transitory computer-readable memory (e.g., 114) having program instructions embodied therewith, the program instructions executable by a processor (e.g., 112) to cause the processor to: access an image (e.g., 104); access a segmentation mask (e.g., 108) indicating where in the image a first structure (e.g., 106) is located; apply a continuous deformation field (e.g., 402) to the segmentation mask, thereby yielding an augmented version (e.g., 404) of the segmentation mask, wherein the continuous deformation field can deform only: pixels or voxels of the segmentation mask that make up the first structure; and pixels or voxels of the segmentation mask that are within a threshold proximity of the first structure (e.g., within 502); and apply the continuous deformation field to the image, thereby yielding an augmented version (e.g., 408) of the image, wherein the continuous deformation field can deform only: pixels or voxels of the image that make up the first structure; and pixels or voxels of the image that are within the threshold proximity of the first structure.

Although not mentioned above, the deformation component 118 can, in some aspects, electronically render the augmented segmentation mask 404 or the augmented medical image 408 (or any suitable projections thereof) on any suitable electronic displays (e.g., on any suitable computer screens or compute monitors).

Although the herein disclosure mainly describes the deformation field 402 as encompassing, covering, or otherwise affecting an entirety of the anatomical structure 106, this is a mere non-limiting example for ease of explanation. In various instances, the deformation field 402 can instead encompass, cover, or otherwise affect a portion of the anatomical structure 106. In such case, the surrounding periphery 502 can still be considered as including whatever pixels or voxels do not belong to that portion of the anatomical structure 106 but that are nevertheless encompassed, covered, or otherwise affected by the deformation field 402. Accordingly, the surrounding periphery 502 in such embodiments can be considered as not fully surrounding or encircling the anatomical structure 106. Instead, the surrounding periphery 502 in such embodiments can be considered as partially surrounding or encircling only that portion of the anatomical structure 106.

Although the herein disclosure mainly describes the anatomy-driven augmentation system 102 as targeting augmentation at or about the single anatomical structure 106, this is a mere non-limiting example for ease of explanation. In various aspects, the medical image 104 and the segmentation mask 108 can illustrate a plurality of anatomical structures of interest, and the deformation component 118 can respectively apply a plurality of deformation fields (e.g., that are continuous and zero at their boundaries) to such plurality of anatomical structures (e.g., can apply a unique or distinct deformation field to each unique or distinct anatomical structure of interest). In this way, higher order (e.g., more complicated) yet nevertheless realistic interactions between deformed anatomical structures can be obtained.

Although FIGS. 2, 7, and 8 mainly depict the deformation field 402 as creating realistic or biologically plausible interactions between the anatomical structure 106 and other anatomical structures (e.g., 202, 204) within which the anatomical structure 106 is nested, this is a mere non-limiting example for ease of illustration. In various embodiments, the deformation field 402 can commensurately deform the surrounding periphery 502 with the anatomical structure 106. Accordingly, any other anatomical structures that are depicted within the surrounding periphery 502 can be commensurately deformed with the anatomical structure 106, whether or not the anatomical structure 106 is nested within those other anatomical structures. In other words, the herein described teachings can be implemented to create biologically plausible or realistic interactions between any neighboring anatomical structures, whether or not those neighboring anatomical structures are nested. Indeed, as shown at least in FIG. 12, the herein described teachings can cause a corpus callosum to realistically interact with a neighboring brain tumor, notwithstanding that the brain tumor is not nested (e.g., embedded) within the corpus callosum.

Moreover, although the herein disclosure mainly describes various embodiments as applying to medical images (e.g., 104) that have corresponding segmentation masks (e.g., 108), this is a mere non-limiting example. Various embodiments described herein can be implemented to perform structure-driven augmentation with respect to any suitable type of images (e.g., with respect to non-medical images) that have corresponding segmentation masks.

Although the herein disclosure mainly describes various embodiments in which the anatomy-driven augmentation system 102 can augment medical images and their associated segmentation masks and can train the deep learning neural network 902 on such augmented images and masks, these are mere non-limiting examples for ease of illustration and explanation. In various aspects, after having trained the deep learning neural network 902, the anatomy-driven augmentation system 102 can electronically deploy the deep learning neural network 902 in any suitable operational context. For example, after training the deep learning neural network 902, the anatomy-driven augmentation system 102 can, in various instances, access a medical image (e.g., having the same format, size, or dimensionality as the medical image 104) for which no ground-truth segmentation mask is available. Accordingly, the anatomy-driven augmentation system 102 can execute the deep learning neural network 902 on that medical image, thereby yielding a predicted or inferred segmentation mask. In some cases, the predicted or inferred segmentation mask can be subsequently utilized by a medical professional for diagnostic or prognostic purposes.

In various instances, machine learning algorithms or models can be implemented in any suitable way to facilitate any suitable aspects described herein. To facilitate some of the above-described machine learning aspects of various embodiments, consider the following discussion of artificial intelligence (AI). Various embodiments described herein can employ artificial intelligence to facilitate automating one or more features or functionalities. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system or environment from a set of observations as captured via events or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events or data.

Such determinations can result in the construction of new events or actions from a set of observed events or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes or systems (e.g., support vector machines, neural networks, expert systems, Bayesian belief networks, fuzzy logic, data fusion engines, and so on) in connection with performing automatic or determined action in connection with the claimed subject matter. Thus, classification schemes or systems can be used to automatically learn and perform a number of functions, actions, or determinations.

A classifier can map an input attribute vector, $z=(z_1, z_2, z_3, z_4, z_n)$, to a confidence that the input belongs to a class, as by $f(z)$=confidence(class). Such classification can employ a probabilistic or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, or probabilistic classification models providing different patterns of independence, any of which can be employed. Classification as used herein also is inclusive of statistical regression that is utilized to develop models of priority.

The herein disclosure describes non-limiting examples. For ease of description or explanation, various portions of the herein disclosure utilize the term "each," "every," or "all" when discussing various examples. Such usages of the term "each," "every," or "all" are non-limiting. In other words, when the herein disclosure provides a description that is applied to "each," "every," or "all" of some particular object or component, it should be understood that this is a non-limiting example, and it should be further understood that, in various other examples, it can be the case that such description applies to fewer than "each," "every," or "all" of that particular object or component.

Figure 14:
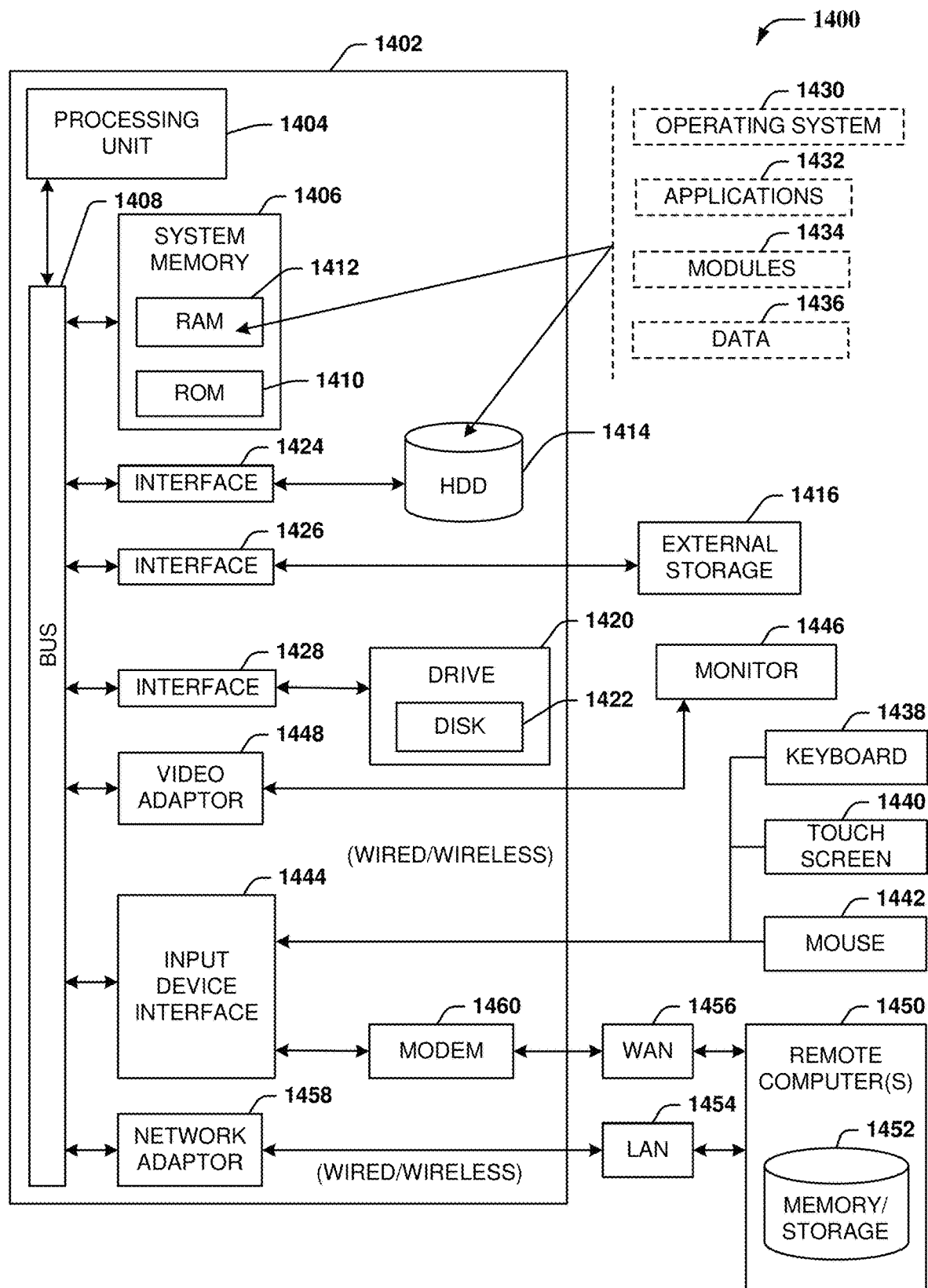
FIG. 14 illustrates a block diagram of an example, non-limiting operating environment in which one or more embodiments described herein can be facilitated.

In order to provide additional context for various embodiments described herein, FIG. 14 and the following discussion are intended to provide a brief, general description of a suitable computing environment 1400 in which the various embodiments of the embodiment described herein can be implemented. While the embodiments have been described above in the general context of computer-executable instructions that can run on one or more computers, those skilled in the art will recognize that the embodiments can be also implemented in combination with other program modules or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multi-processor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14, the example environment 1400 for implementing various embodiments of the aspects described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A basic input/output system (BIOS) can be stored in a non-volatile memory such as ROM, erasable programmable read only memory (EPROM), EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive (HDD) 1414 (e.g., EIDE, SATA), one or more external storage devices 1416 (e.g., a magnetic floppy disk drive (FDD) 1416, a memory stick or flash drive reader, a memory card reader, etc.) and a drive 1420, e.g., such as a solid state drive, an optical disk drive, which can read or write from a disk 1422, such as a CD-ROM disc, a DVD, a BD, etc. Alternatively, where a solid state drive is involved, disk 1422 would not be included, unless separate. While the internal HDD 1414 is illustrated as located within the computer 1402, the internal HDD 1414 can also be configured for external use in a suitable chassis (not shown). Additionally, while not shown in environment 1400, a solid state drive (SSD) could be used in addition to, or in place of, an HDD 1414. The HDD 1414, external storage device(s) 1416 and drive 1420 can be connected to the system bus 1408 by an HDD interface 1424, an external storage interface 1426 and a drive interface 1428, respectively. The interface 1424 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, or data can also be cached in the RAM 1412. The systems and methods described herein can be implemented utilizing various commercially available operating systems or combinations of operating systems.

Computer 1402 can optionally comprise emulation technologies. For example, a hypervisor (not shown) or other intermediary can emulate a hardware environment for operating system 1430, and the emulated hardware can optionally be different from the hardware illustrated in FIG. 14. In such an embodiment, operating system 1430 can comprise one virtual machine (VM) of multiple VMs hosted at computer 1402. Furthermore, operating system 1430 can provide runtime environments, such as the Java runtime environment or the .NET framework, for applications 1432. Runtime environments are consistent execution environments that allow applications 1432 to run on any operating system that includes the runtime environment. Similarly, operating system 1430 can support containers, and applications 1432 can be in the form of containers, which are lightweight, standalone, executable packages of software that include, e.g., code, runtime, system tools, system libraries and settings for an application.

Further, computer 1402 can be enable with a security module, such as a trusted processing module (TPM). For instance with a TPM, boot components hash next in time boot components, and wait for a match of results to secured values, before loading a next boot component. This process can take place at any layer in the code execution stack of computer 1402, e.g., applied at the application execution level or at the operating system (OS) kernel level, thereby enabling security at any level of code execution.

A user can enter commands and information into the computer 1402 through one or more wired/wireless input devices, e.g., a keyboard 1438, a touch screen 1440, and a pointing device, such as a mouse 1442. Other input devices (not shown) can include a microphone, an infrared (IR) remote control, a radio frequency (RF) remote control, or other remote control, a joystick, a virtual reality controller or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1404 through an input device interface 1444 that can be coupled to the system bus 1408, but can be connected by other interfaces, such as a parallel port, an IEEE 1394 serial port, a game port, a USB port, an IR interface, a BLUETOOTH® interface, etc.

A monitor 1446 or other type of display device can be also connected to the system bus 1408 via an interface, such as a video adapter 1448. In addition to the monitor 1446, a computer typically includes other peripheral output devices (not shown), such as speakers, printers, etc.

The computer 1402 can operate in a networked environment using logical connections via wired or wireless communications to one or more remote computers, such as a remote computer(s) 1450. The remote computer(s) 1450 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1452 is illustrated. The logical connections depicted include wired/wireless connectivity to a local area network (LAN) 1454 or larger networks, e.g., a wide area network (WAN) 1456. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 can be connected to the local network 1454 through a wired or wireless communication network interface or adapter 1458. The adapter 1458 can facilitate wired or wireless communication to the LAN 1454, which can also include a wireless access point (AP) disposed thereon for communicating with the adapter 1458 in a wireless mode.

When used in a WAN networking environment, the computer 1402 can include a modem 1460 or can be connected to a communications server on the WAN 1456 via other means for establishing communications over the WAN 1456, such as by way of the Internet. The modem 1460, which can be internal or external and a wired or wireless device, can be connected to the system bus 1408 via the input device interface 1444. In a networked environment, program modules depicted relative to the computer 1402 or portions thereof, can be stored in the remote memory/storage device 1452. It will be appreciated that the network connections shown are example and other means of establishing a communications link between the computers can be used.

When used in either a LAN or WAN networking environment, the computer 1402 can access cloud storage systems or other network-based storage systems in addition to, or in place of, external storage devices 1416 as described above, such as but not limited to a network virtual machine providing one or more aspects of storage or processing of information. Generally, a connection between the computer 1402 and a cloud storage system can be established over a LAN 1454 or WAN 1456 e.g., by the adapter 1458 or modem 1460, respectively. Upon connecting the computer 1402 to an associated cloud storage system, the external storage interface 1426 can, with the aid of the adapter 1458 or modem 1460, manage storage provided by the cloud storage system as it would other types of external storage. For instance, the external storage interface 1426 can be configured to provide access to cloud storage sources as if those sources were physically connected to the computer 1402.

The computer 1402 can be operable to communicate with any wireless devices or entities operatively disposed in wireless communication, e.g., a printer, scanner, desktop or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 15:
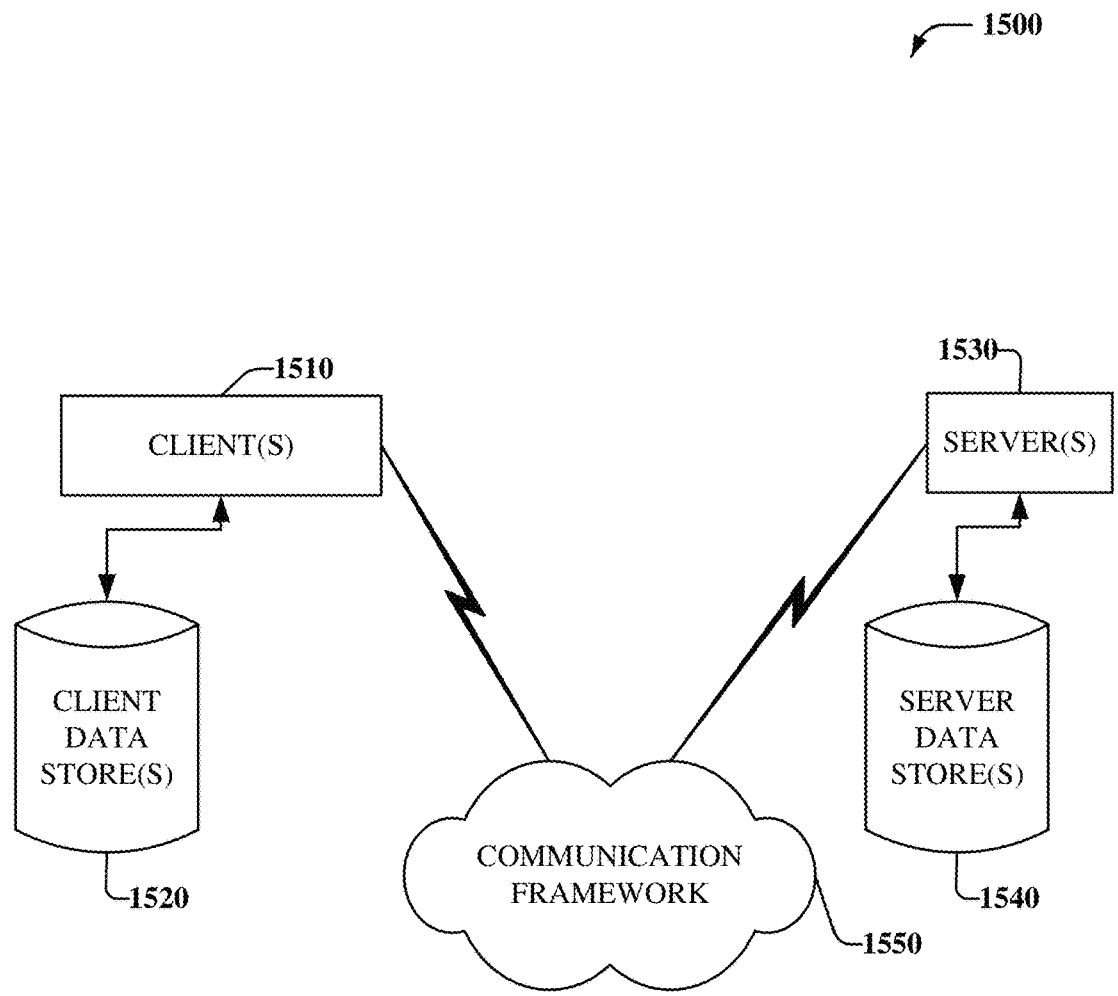
FIG. 15 illustrates an example networking environment operable to execute various implementations described herein.

FIG. 15 is a schematic block diagram of a sample computing environment 1500 with which the disclosed subject matter can interact. The sample computing environment 1500 includes one or more client(s) 1510. The client(s) 1510 can be hardware or software (e.g., threads, processes, computing devices). The sample computing environment 1500 also includes one or more server(s) 1530. The server(s) 1530 can also be hardware or software (e.g., threads, processes, computing devices). The servers 1530 can house threads to perform transformations by employing one or more embodiments as described herein, for example. One possible communication between a client 1510 and a server 1530 can be in the form of a data packet adapted to be transmitted between two or more computer processes. The sample computing environment 1500 includes a communication framework 1550 that can be employed to facilitate communications between the client(s) 1510 and the server(s) 1530. The client(s) 1510 are operably connected to one or more client data store(s) 1520 that can be employed to store information local to the client(s) 1510. Similarly, the server(s) 1530 are operably connected to one or more server data store(s) 1540 that can be employed to store information local to the servers 1530.

The present invention may be a system, a method, an apparatus or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network or a wireless network. The network can comprise copper transmission cables, optical transmission fibers, wireless transmission, routers, firewalls, switches, gateway computers or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations or block diagrams of methods, apparatus (systems), and computer program products according to embodiments of the invention. It will be understood that each block of the flowchart illustrations or block diagrams, and combinations of blocks in the flowchart illustrations or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks. These computer readable program instructions can also be stored in a computer readable storage medium that can direct a computer, a programmable data processing apparatus, or other devices to function in a particular manner, such that the computer readable storage medium having instructions stored therein comprises an article of manufacture including instructions which implement aspects of the function/act specified in the flowchart or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer or computers, those skilled in the art will recognize that this disclosure also can or can be implemented in combination with other program modules. Generally, program modules include routines, programs, components, data structures, etc. that perform particular tasks or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, or a computer. By way of illustration, both an application running on a server and the server can be a component. One or more components can reside within a process or thread of execution and a component can be localized on one computer or distributed between two or more computers. In another example, respective components can execute from various computer readable media having various data structures stored thereon. The components can communicate via local or remote processes such as in accordance with a signal having one or more data packets (e.g., data from one component interacting with another component in a local system, distributed system, or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. As used herein, the term "and/or" is intended to have the same meaning as "or." Moreover, articles "a" and "an" as used in the subject specification and annexed drawings should generally be construed to mean "one or more" unless specified otherwise or clear from context to be directed to a singular form. As used herein, the terms "example" or "exemplary" are utilized to mean serving as an example, instance, or illustration. For the avoidance of doubt, the subject matter disclosed herein is not limited by such examples. In addition, any aspect or design described herein as an "example" or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory configured to store computer executable components; and
a processor that executes at least one of the computer-executable components that:
accesses a medical image and a ground-truth segmentation mask corresponding to the medical image, wherein the ground-truth segmentation mask indicates respective locations of a first plurality of anatomical structures depicted in the medical image; and
creates an augmented version of the medical image and an augmented version of the ground-truth segmentation mask, by applying a continuous deformation field to fewer than all pixels or voxels in the medical image and in the ground-truth segmentation mask, wherein the continuous deformation field encompasses:
first pixels or first voxels in the medical image that correspond to a first anatomical structure of the plurality of anatomical structures; and
second pixels or second voxels in the medical image that correspond to a surrounding periphery of the first anatomical structure, wherein at least a portion of a second anatomical structure of the plurality of anatomical structures is depicted by the second pixels or second voxels that correspond to the surrounding periphery, such that the continuous deformation field deforms the portion of the second anatomical structure commensurately with the first anatomical structure, and wherein deformation of the first anatomical structure is constrained based on a defined criterion associated with the second anatomical structure for retaining biological plausibility of the deformation of the first anatomical structure.

2. The system of claim 1, wherein the biological plausibility of the deformation of the first anatomical structure is based on a physical limitation associated with the deformation of the portion of the second anatomical structure.

3. The system of claim 1, wherein the medical image is a magnetic resonance imaging scan of a brain, wherein the first anatomical structure is a brain tumor, and wherein the second anatomical structure is a corpus callosum of the brain.

4. The system of claim 1, wherein the medical image is a trans-vaginal ultrasound scan, wherein the first anatomical structure is a fibroid, and wherein the second anatomical structure is an endometrium.

5. The system of claim 1, wherein the at least one of the computer-executable components further:
trains a deep learning neural network on the augmented version of the medical image and the augmented version of the ground-truth segmentation mask.

6. The system of claim 1, wherein the continuous deformation field tapers to zero at its boundary.

7. The system of claim 1, wherein the continuous deformation field causes the first anatomical structure or the surrounding periphery of the first anatomical structure to expand, contract, translate, rotate, or shear.

8. A computer-implemented method, comprising:
accessing, by a device operatively coupled to a processor, a medical image and a ground-truth segmentation mask corresponding to the medical image, wherein the ground-truth segmentation mask indicates respective locations of a plurality of anatomical structures depicted in the medical image; and
creating, by the device system, an augmented version of the medical image and an augmented version of the ground-truth segmentation mask, by applying a continuous deformation field to fewer than all pixels or voxels in the medical image and in the ground-truth segmentation mask, wherein the continuous deformation field encompasses:
first pixels or first voxels in the medical image that correspond to a first anatomical structure of the plurality of anatomical structures; and
second pixels or second voxels in the medical image that correspond to a surrounding periphery of the first anatomical structure, wherein at least a portion of a second anatomical structure of the plurality of anatomical structures is depicted by the second pixels or second voxels that correspond to the surrounding periphery, such that the continuous deformation field deforms the portion of the second anatomical structure commensurately with the first anatomical structure, and wherein deformation of the first anatomical structure is constrained based on a defined criterion associated with the second anatomical structure for retaining biological plausibility of the deformation of the first anatomical structure.

9. The computer-implemented method of claim 8, wherein the biological plausibility of the deformation of the first anatomical structure is based on a physical limitation associated with the deformation of the portion of the second anatomical structure.

10. The computer-implemented method of claim 8, wherein the medical image is a magnetic resonance imaging scan of a brain, wherein the first anatomical structure is a brain tumor, and wherein the second anatomical structure is a corpus callosum of the brain.

11. The computer-implemented method of claim 8, wherein the medical image is a trans-vaginal ultrasound scan, wherein the first anatomical structure is a fibroid, and wherein the second anatomical structure is an endometrium.

12. The computer-implemented method of claim 8, further comprising:
training, by the system, a deep learning neural network on the augmented version of the medical image and the augmented version of the ground-truth segmentation mask.

13. The computer-implemented method of claim 8, wherein the continuous deformation field tapers to zero at its boundary.

14. The computer-implemented method of claim 8, wherein the continuous deformation field causes the first anatomical structure or the surrounding periphery of the first anatomical structure to expand, contract, translate, rotate, or shear.

15. A computer program product for facilitating anatomy-driven augmentation of medical images, the computer program product comprising a non-transitory computer-readable memory having program instructions embodied therewith, the program instructions executable by a processor to cause the processor to:
access a medical image and a ground-truth segmentation mask corresponding to the medical image, wherein the ground-truth segmentation mask indicates respective locations of a plurality of anatomical structures depicted in the medical image; and
create an augmented version of the medical image and an augmented version of the ground-truth segmentation mask, by applying a continuous deformation field to fewer than all pixels or voxels in the medical image and in the ground-truth segmentation mask, wherein the continuous deformation field encompasses deforms only:

first pixels or first voxels in the medical image that correspond to first anatomical structure of the plurality of anatomical structures; and second pixels or second voxels in the medical image that correspond to a surrounding periphery of the first structure, wherein at least a portion of a second anatomical structure of the plurality of anatomical structures is depicted by the second pixels or second voxels that correspond to the surrounding periphery, such that the continuous deformation field deforms the portion of the second anatomical structure commensurately with the first anatomical structure, and wherein deformation of the first anatomical structure is constrained based on a defined criterion associated with the second anatomical structure for retaining biological plausibility of the deformation of the first anatomical structure.

16. The computer program product of claim 15, wherein the biological plausibility of the deformation of the first anatomical structure is based on a physical limitation associated with the deformation of the portion of the second anatomical structure.

17. The computer program product of claim 15, wherein the medical image is a magnetic resonance imaging scan of a brain, wherein the first anatomical structure is a brain tumor, and wherein the second anatomical structure is a corpus callosum of the brain.

18. The computer program product of claim 15, wherein the medical image is a trans-vaginal ultrasound scan, wherein the first anatomical structure is a fibroid, and wherein the second anatomical structure is an endometrium.

19. The computer program product of claim 15, wherein the program instructions are further executable by the processor to cause the processor to:

train a deep learning neural network, using the augmented version of the medical image as a training input, and using the augmented version of the segmentation mask as a ground-truth annotation.

20. The computer program product of claim 15, wherein the continuous deformation field tapers to zero at its boundary.

* * * * *